Figure 1:
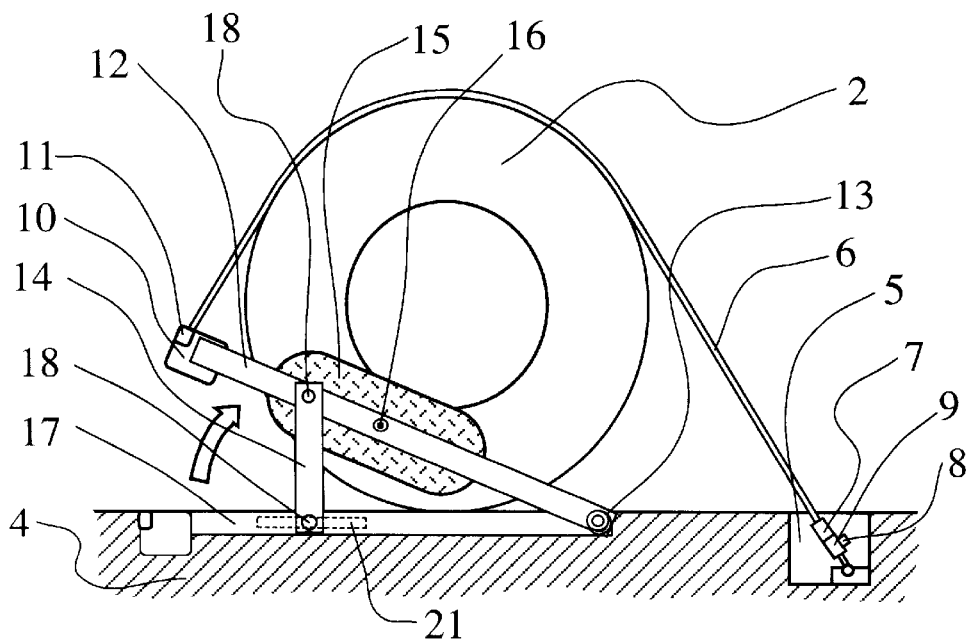

United States Patent [19]

Minakami et al.

[11] Patent Number: 6,095,731
[45] Date of Patent: Aug. 1, 2000

[54] WHEEL FIXING APPARATUS, PALLET/TRUCK AND WHEEL FIXING METHOD, AUTOMATIC WHEEL FIXING APPARATUS AND MODE INTERCHANGE

[76] Inventors: Hiroyuki Minakami, 1-1, Nishi Okamoto 2-chome, Higashinada-ku, Kobe-shi, Hyogo 658; Motoyuki Minakami, 6-16, Agenoki 1-chome, Matsue-shi, Shimane 690, both of Japan

[21] Appl. No.: 08/727,555
[22] PCT Filed: Jul. 31, 1995
[86] PCT No.: PCT/JP95/01518
  § 371 Date: Dec. 18, 1996
  § 102(e) Date: Dec. 18, 1996
[87] PCT Pub. No.: WO96/05981
  PCT Pub. Date: Feb. 29, 1996

[30] Foreign Application Priority Data

Aug. 18, 1994 [JP] Japan .................................. 6-228594

[51] Int. Cl.⁷ ...................................................... B60P 7/08
[52] U.S. Cl. ................... 410/20; 410/10; 410/12; 410/19; 410/119
[58] Field of Search ................... 410/7, 9, 10, 11, 410/12, 20, 21, 23, 19, 119; 248/499; 108/55.1, 55.3

[56] References Cited

U.S. PATENT DOCUMENTS

| | | | |
|---|---|---|---|
| 3,847,091 | 11/1974 | Holt | 410/119 |
| 4,310,271 | 1/1982 | Canellis et al. | 410/119 X |
| 4,573,842 | 3/1986 | Mantela et al. | 410/23 |
| 4,611,961 | 9/1986 | Van Iperon et al. | 410/20 |
| 4,960,353 | 10/1990 | Thorndyke | 410/20 |
| 5,108,237 | 4/1992 | Zankich | 410/10 X |
| 5,294,221 | 3/1994 | Eller et al. | 410/20 X |
| 5,330,148 | 7/1994 | Floyd | 410/20 X |
| 5,584,622 | 12/1996 | Dickerson, Sr. | 410/21 |
| 5,593,260 | 1/1997 | Zimmerman | 410/20 |
| 5,833,413 | 11/1998 | Cornelius | 410/119 |

FOREIGN PATENT DOCUMENTS

| | | | |
|---|---|---|---|
| 62-13 | 1/1987 | Japan . | |
| 3-24432 | 3/1991 | Japan . | |
| 4-279481 | 10/1992 | Japan | 410/20 |
| 5-112285 | 5/1993 | Japan . | |
| 5-56792 | 7/1993 | Japan . | |
| 6-45397 | 11/1994 | Japan . | |
| 100826 | 3/1962 | Netherlands | 410/20 |

*Primary Examiner*—Stephen T. Gordon
*Attorney, Agent, or Firm*—Limbach & Limbach L.L.P.

[57] ABSTRACT

A system is disclosed which can be used to fix a wheel to a pallet or truck, as in fastening a seat belt, by way of a wheel side supporting apparatus and a fixing apparatus for fastening, and which can be used in a high-speed transportation system for regular automobiles. The fixing apparatus for fastening has one end similar to the tongue plate device used in an automobile seat belt system and another end connectable to a retractor. The support apparatus has one end connected to the floor of the pallet or truck by a hinge, and the other end equipped with the retractor. The whole body of the support apparatus can be put into the floor of the pallet or truck, and is used to support the side of the wheel. A stopper on one end of the fixing apparatus is installed in the floor of pallet or truck.

8 Claims, 16 Drawing Sheets

WHEEL FIXING APPARATUS, PALLET/TRUCK AND WHEEL FIXING METHOD, AUTOMATIC WHEEL FIXING APPARATUS AND MODE INTERCHANGE

FIELD OF THE INVENTION

This invention is related to the fixation of a wheel of a vehicle to a selected place, for example, on a floor or on a pallet. It is also related to an apparatus for performing the fixation, particularly a pallet for performing the fixation, the method for the fixation, an automated fixation system and apparatus, and a mode-interchange for loading a vehicle onto a pallet or unloading the vehicle from the pallet. In this invention, as described and except as further explained below, the "wheel" includes a tire, steel wheel or roller; the "vehicle" means automobiles including cars and trucks, coaches, vans or containers with wheels attached; and the "pallet" includes a pallet itself, a rack, or a container with wheels attached.

BACKGROUND OF THE INVENTION

When a vehicle needs to be fixed in place, usually, a triangle-shaped apparatus is set in front and in back of the vehicle's wheel. Sometimes a chain is used to connect the vehicle to the floor of the pallet. Also, when a vehicle is loaded onto a parking area, an uneven or friction device is sometimes used to hold the vehicle on the pallet. For example, Japanese Patent Provisional Publication No. 146684/94 discloses adhering the bumper to the pallet.

Usually, when the vehicle needs to be fixed-in place, the general form of transporting or shipping the vehicle involves a train system or piggyback system.

Now, the usual style of fixing an automobile is slow and cumbersome, using the triangle block and chain with a turn buckle. Each apparatus must be set individually. In order to minimize this clumsy manual operation within the piggyback system, a car rack is used.

In multiple level parking garages, we see a vast difference in degrees of automobile security. The current method for securing an automobile on a parking pallet is basically a hand brake or emergency brake within the automobile. The level of safety, therefore, depends upon the strength and effectiveness of each automobile's brake system.

The Japanese Patent Provisional Publication No. 59270/91 proposes the installation of an indented area, for the lower part of the tire, on a pallet in a garage parking system. In this case, the proposed system may be able to fix the tire only for slow moving pallets. However, there are inevitable problems within this proposed system because these indentions do not guarantee tightness while fixing tire.

Actually, the only fixing force comes from the friction between the tire and the indented area in the pallet floor. The tire is stopped only by the vehicle's brake. This proposed system only functions when the pallet moves slowly in a negligible acceleration or deceleration. For example, in the parking system, the pallet moves less than 10 Km/Hr. If the pallet moves faster, the system gains a higher acceleration or deceleration rate. The friction between the tire and the surface of the floor of the pallet becomes insufficient to hold the tire and vehicle. In a high speed scenario, the automobile may easily come free of the pallet.

To solve the above problems, a new method was introduced. The proposed Japanese Patent Provisional Publication No. 193733/90 system incorporates a harness which is attached to the wheel. This apparatus is connected to a harness web and is attached over the wheel. Basically, in this method, a harness web wraps around the rail wheel which harness web is fixed to the wheel fixing body on the rail. Also, because the mechanism of the wheel fixing is complicated, this method is not a good method except for the railroad system in the United States of America. The whole procedure must start with fixing the wheel fixing body on the rail road. Thus, the process and mechanisms are complicated, cumbersome and time consuming.

Also, as to the method of fixing the automobile utilizing its bumper as it is seen in Japanese Patent Provisional Publication No. 146648/94, the apparatus required to perform such fixing becomes large in size. As a result, the pallet's thickness becomes thicker. According to the above proposed method, in order to store the pallet/vehicle or the apparatus, which is defined as the stopper for moving in the above Japanese Patent Provisional Publication, a large space is needed. Consequently, the equipment and labor cost become higher.

In the case of fixing the automobile to the floor of an automobile cargo ship, the ship shakes up and down, right and left. Thus, the automobile needs to be tied by rope or chain. In such case, each automobile needs to be tied by hand. Therefore, the labor cost becomes higher.

In the case of a transportation system where the pallet/vehicle carries the automobile being transported, the thickness of the pallet/vehicle is an important issue. If the thickness becomes thicker due to the fixing apparatus, the total handling cost of the transportation becomes high. Because the thicker thickness of the pallet/vehicle, the more storing space is required. This problem causes requirement of more stock yard storage for the pallet/vehicle in the transportation system. According to the proposed method, because the anchor protrudes from the floor, over-layering of the pallet/vehicles becomes difficult to do. Even if over-layer is possible, it becomes unstable.

Furthermore, the usual fixing methods, such as utilizing a chain and turn-buckle, are not easy to use because each automobile may require a different position of the hook. Therefore, in order to accommodate each automobile's need, the operation is handled manually. This means that any mechanization or automation of this procedure is difficult.

Because of this problem, the fixing procedure is completed by manual and consumes heavy labor cost.

Usual fixing methods, such as utilizing chain and turn-buckle, are difficult fixing work because the chain or turn-buckle can be stored in the floor of the fixing side. When the automobile is fixed, these fixing apparatus need to be untangled and arranged properly.

In the case of a piggy back carrying system, the automobile is carried on the cargo train and it is fixed manually. Also, when the automobile is loaded onto the carrier on the cargo train, the driver needs to pay special attention because the clearance height of the cargo is significant. This causes loading to take a long time. Thus, at the point the traveling (driving) mode changes, traffic becomes congested.

Moreover, in case of carrying automobiles by the pallet, usually no drivers or passengers are allowed to ride on it. Therefore, so far the issue of traveling comfort has not been critical, even when the automobile is fixed by the anchored chain or turn buckle. When the automobile is not fixed by its wheels, the automobile's body must be tied firmly. Thus, the suspension of the automobile is sacrificed and this causes an uncomfortable ride. Also, the distance of the tying length is verified by shaking the traveling pallet, which may cause the tension of the tie to be loosened.

This invention is made to solve the problems described above. Even though the automobile carrying and fixing side (such as pallet or vehicle, cargo ship floor and piggy back cargo train floor) moves too quickly, this invention is able to provide the system which fixes an automobile firmly. Also, the thickness of the apparatus remains thin, so that the apparatus is easy to store. The apparatus is simple and allows prompt fixing, and an automated procedure. This invention provides such a fixing apparatus and method of fixing.

In addition, this invention provides an automated wheel fixing apparatus through the application of the wheel fixing apparatus and the fixing method of this invention. Also, the invention provides a mode interchange in which an automobile can change its traveling (driving) mode by fixing or unfixing the automobile to a pallet/vehicle automatically.

DETAIL DESCRIPTION OF THE INVENTION

In order to achieve the objectives described above we must design a new concept. The basic structure consists of a belt and a retractor. The belt ties the wheel down to the pallet while surrounding the upper circumference of the wheel. Also, the wheel side support apparatus (WSSA) is installed in order to stop the lateral movement of the wheel. The belt is attached on both sides of the wheel. Therefore, the wheel is secured.

One of the methods for fixing the wheel will be described henceforth. One end of the belt is equipped with a hook. The other end is part of the retractor system which is rolled into the belt holder apparatus. This end is a fixture and part of the pallet itself.

With the new system, the belt emerges from a hatch door, which is part of the pallet, and encircles the top of the wheel and is then attached on the other side. This belt can be extended and fitted to any size wheel and still provide the same high level of safety. The system is equipped with a retracting device, which determines the specific amount of length required.

This fixing apparatus is similar to the tongue plate device used in an automobile's seat belt system; namely the buckle retractor and insertion tongue, which creates a secure fixing system. The wheel fixation apparatus incorporates this idea. A benefit of using this system, is the ease with which the wheel can be fixed to a pallet or floor. The relative smallness of this system adds to the benefits of a small pallet. This system is built within the pallet and therefore does not change the pallet size at all. The afore mentioned hatch door provides a smooth surface which is flat when not in use and hence provides for easy loading and unloading of the vehicle.

With this new method, the wheel is fixed by the belt. Therefore, when it is in use, the belt must fasten firmly, otherwise, the fixation will loosen. Also, when a belt is not in use, it becomes an obstacle. Therefore, the retractor is installed which rolls the belt into the inside of the pallet.

When the belt is rolled over the wheel and down towards the floor, in order to prevent slippage of the belt from the wheel surface, a nonskid material is used. In this method, the fixing becomes more secure.

In order to prevent sliding of the belt off to the sides of the wheel, application of the nonskid material can be used as it is described above. However, another method is available, such as the utilization of a side belt for the wheel. This is different from the roll down belt. When the main and side belts are connected by a harness, the side of belt pulls the main belt. Therefore, the main belt is always tense by way of the side belt. Thus, the fixation becomes firm, and this prevents the side way sliding.

In this invention, the wheel-side support apparatus is proposed as one of the necessary elements for the fixation apparatus. This prevents the wheel from sliding in the side direction. Because a complete fixation can not be provided by only tightening the belt, the specially made wheel-side support apparatus is necessary, and the complete fixation can be provided by the adoption of the wheel side support apparatus.

To support the wheel from the side, one edge of the wheel side support apparatus is raised from the floor surface, and the other edge is connected by a hinge, which is fixed in the floor. Then, the arm supports the side of the wheel and prevents the sliding of the wheel as well. At this time, the air bag is installed between the arm of the wheel-side support apparatus and the vehicle's wheel. When the wheel is to affixed, the air bag is then inflated to intrude into the gap between the arm of the wheel-side support apparatus and the vehicle's wheel. This method provides a more firm grasping of the wheel. Until the vehicle is loaded onto the pallet, the fixing apparatus is stored in the floor.

There are several methods for extending the arm from the floor. One method is that one arm per wheel is extended, another method is that of two arms per wheel being extended at the same time. With both methods, the retractor is installed on the edge of the arm, the belt is pulled from the retractor, then the belt is pulled over the wheel, pushing the wheel down to the floor. The belt is then fixed to the floor or the edge of the other arm by the buckle or retractor. According to this method, the wheel is not only pushed down to the floor by the belt itself, but also the side of the wheel is fixed by the wheel side support apparatus (arm). Therefore, the wheel is fixed firmly to the floor. The following are examples of this invention's procedures:

(1) A process at least comprising the following procedure, in the method of using the apparatus which has a belt that on one end of which has tongue plate, and the other end of which is connected to a retractor,
  a. Pulling the belt from the retractor, which is installed in the floor,
  b. Rolling the belt over the wheel by pulling the belt out from the retractor,
  c. The buckle is pulled as the belt is being rolled over the wheel, and the buckle is fixed to the hook which is installed on the floor,
  d. One of the ends of the wheel-side support apparatus which is installed on the floor is raised as the other end of the wheel-side support apparatus is being fixed on the floor.

(2) A process at least comprising the following procedure, in the method of using the apparatus which has the belt that on one end of which has tongue plate, and the other end of which is connected to the retractor,
  a. Raising up one end of the wheel side support apparatus from the floor as the other end of wheel side support apparatus operates as a fulcrum hinge,
  b. Rolling the belt over the wheel by pulling the belt out from the retractor which is installed in the floor or on the wheel side support apparatus,
  c. Pulling and rolling the belt over the wheel with the tongue plate leading the belt,
  d. Fixing said tongue plate to the buckle which is installed in the floor, as the belt is being pulled out from said retractor, and rolling the belt over the wheel.

(3) A process at least comprising the following procedure, in the method of using the apparatus which has the belt that on one end of which has tongue plate, and the other end of which is connected to the retractor, and wheel side support apparatus which has an air bag, a. Raising up one end of the wheel side support apparatus from the floor as the other end of wheel side support apparatus operates as a fulcrum hinge,
b. Inflating the air bag which is installed in the wheel side support apparatus,
c. Rolling the belt over the wheel by pulling the belt out from the retractor which is installed in the floor or on the wheel side support apparatus,
d. Pulling and rolling the belt over the wheel with the tongue plate leading the belt,
e. Fixing the tongue plate to the buckle, as the pulled out, and pulled out, and rolling the belt over the wheel.

In a transportation system in which each vehicle is put on a pallet, the loaded pallet is mobilized on the guideway. It is desirable that the fixation procedures be automated. This is because when many vehicles are to be loaded and unloaded to and from the pallets speed is a necessity.

In order to develop a system which is able to load and unload many vehicles in a short period of time automatically, it is proposed that this wheel fixation apparatus is installed along the line outside each wheel. Henceforth, the wheel fixation system is comprised of a positioning device which detects the position of the wheel using an image treatment monitor, a clamping device which grips the stopper or tongue plate by motor driven hands, and a pulling device which secures the belt by motor driven arms. All movement and positioning is regulated by the information which comes from the sensor and regulator.

When using both sides of the wheel side support apparatus at the same time, an (air) injection mouth is installed on the automatic wheel fixation apparatus to inject compressed (air) into the air bag. This is installed on the wheel side support apparatus. In this case, a pump and a compressed air tank are installed around the apparatus. The (air) injection mouth is installed on the arm of the apparatus.

Furthermore, a wheel positioning system can be installed in order to adjust the position of the wheel fixation apparatus for fixing the wheel to the floor. In this case, the fixation adjusting system is installed on the support of the wheel fixation apparatus system. The adjustment itself is completed by adjusting the position of the support. Usually the support is installed on a rail system, then the precise positioning is performed by using a screw-bolt, ball thread or converting-screw system. When the screw-bolt or converting-screw system is installed, these screws are turned to adjust the position of the wheel.

In the case of installing the adjusting apparatus on the pallet, a rotary handle is installed on the arm of the apparatus in order to set the position by using the ball thread which is set in the support. In the case of adjusting the position using a rail system, a rail locking system is necessary to fix the position.

As mentioned above, because many vehicles need to be interchanged to be mobilized in the transportation system as quickly as possible, a designated mode-interchange is installed. In the mode-interchange, usually four of the wheel fixation apparatus per one gate are installed to match the number of the vehicle wheels. When the vehicle is set correctly on the pallet, all four of the apparatus begin fixing the wheel to the floor simultaneously. For example, a passenger vehicle is placed on the pallet. Four wheels must be fixed to the pallet. Therefore, four of the apparatus are installed at the gate. After loading the vehicle on the pallet, an arm from the apparatus reaches out to the retractor to grasp the tongue plate of the belt. The arm pulls the belt over the tire (wheel). The tongue plate is then inserted into the belt stopper to lock it. Doing so, the wheel is firmly fixed on the floor because the wheel is secured to the floor by the belt, and it's tension. As described above, the number of apparatus to be installed is matched to the number of wheels on the vehicle. The vehicle is firmly fixed to the pallet. This is all completed automatically.

This all depends on the type of vehicle, traffic conditions, vehicle size, and the material of the belt selected to meet the load requirements during transportation. Of course, the initial design is to meet the crash force or sustaining force. This is absolutely necessary.

The belt is for fixing and pulling the wheel down to the floor. To be more effective and fix the wheel firmly, getting rid of the looseness of the belt is necessary. Therefore, the material of the belt can be fabric or rubber, which are very flexible. However, based on the history of actual usage and testing to this point, the material used in seat belts is the most desirable.

When the belt is attached to a retractor, the belt is continuously being pulled by the retractor, thus the belt is not loose. Also, in order to increase the fiction force between the belt and the tire, it might be better to use a rubber material for the belt.

The fixing anchor, such as a buckle, is usually installed on the fixing side. This is usually the floor of the pallet, or on the wheel side support apparatus. The fixing tool or anchor, such as the buckle, is for attaching the belt and locking the belt, and functions in a similar way as a buckle. The basic structure for the buckle is the seat belt buckle, which has a significant reputation for holding the passenger in an automobile, as a fixed attachment. The fixing anchor is used when the stopper or tongue plate for the belt is hooked in place. Thus, the fixing anchor has the basic structure to clamp the hook; namely the stopper or tongue plate. Also, these buckles and anchors would be installed under the floor as to not protrude from the floor. In this way, the floor is flat for unobstructed transference of the vehicle.

For a buckle which is fixed to a belt, usually a locking system is applied. The locking system is basically the same as a seat belt locking system, when the end of the belt is put into the buckle, the lock is automatically set. Also, the releasing mechanism of the lock is installed on the buckle side. A button is usually installed, considering that the buckle and the anchor are installed in the pallet floor, for adjustment or release of the tongue plate from the locked condition.

The retractor is the apparatus for rolling the belt back into place. It is installed in the pallet floor. The belt is rolled by the retractor's spiral shaped spring, and pulled tight to be free of looseness. The retractor's locking system is released prior to the belt being pulled out from the retractor. After the belt is pulled out to the desired position, the retractor automatically rolls the belt back so that the belt is free of looseness. As a result, the belt becomes taut. As is the case with a seat belt, once the length of belt is released from the retractor, that length is fixed. This is for safety reasons. If the belt were not a fixed length, it would be unnecessary. Anyhow, after the belt is set to the right position, the belt will not be loose and will be tightened. After being locked by the retractor's locking system, the belt cannot be pulled out further. Therefore, the wheel is fixed securely.

By rolling the belt over the wheel (upper portion of the wheel), the wheel is pushed down to the floor. The vehicle is fixed on the pallet securely. Even if the pallet moves abruptly and generates a great amount of velocity or acceleration, the vehicle's wheels are fixed firmly to prevent any deviation of vehicle from the pallet.

According to this invention and method, a much higher security and stability of the fixing are able to be obtained. In this invention, it is better for all of the wheels to be fixed in the system. However, it may be enough that only two or three of the wheels to be fixed to the floor. Fixing four to the floor provides just that much more security.

The major function of the belt is to tighten the wheel and to push down the wheel to the floor. Thus, what also must be considered is the prevention of sliding of the wheel. In order to prevent this sliding, all or part of the belt material is made from a flexible or spring like materia so that the belt will not loosen. This method is very effective. Also, skid proof materials can be applied to the belt.

Also, it will be better that the belt is made like a net or a harness to hold or surround the top portion of the wheel so it will not slide off the wheel. Also, the belt is separated into a main belt which pushes the wheel to the floor, and aside belt which holds the wheel from the side. This is a better system. Furthermore, a tube structure can be attached to the belt, so that the tube can be injected with compressed gas (air) and inflated. The inflated tube holds the side of the wheel more firmly. This prevents the belt's sliding off of the wheel.

While the wheel side support apparatus is not in use, the apparatus is positioned inside the pallet. However, when the wheel side support apparatus is in use, one end is hinged, then the other end is extracted is extracted from the inside of the floor. This arm becomes a support of the wheel side support apparatus. With this apparatus functioning the wheel cannot move laterally. Also when the wheel side support apparatus is designed to surround the wheel from above, the fixing becomes much more secure, restricting all side ways sliding. When the air bag is installed on the wheel side support apparatus, after inflating the bag, the gap between the wheel and the wheel side support apparatus is taken away. The wheel and the wheel side support apparatus are thus in direct contact, which provides for a better hold on the wheel.

Because there is a difference in vehicles regarding the wheel position, this invention adjusts to those differences. Determining wheel position is not difficult when using photo-sensors, image treatment scanners and closing sensors. This apparatus can easily adjust to the position of the wheel. The automatic arm takes the tongue plate by clamping it, then it pulls the belt out from the retractor, and puts it into the lock to fix the wheel, all the while this is being monitored. If the retractor is attached on the wheel side support apparatus, the fixation is performed as described above. As it is described above, the whole operation in which each wheel is fixed onto the pallet can be fully automated.

When the vehicle is put on the pallet at the mode-interchange, according to this invention, this whole process can be fully automated. The plurality of the outstanding fixation apparatus (usually four units) are installed along the line of the guideway of the pallet. In this mode-interchange (toll gate), the vehicle mounts the pallet without any operation. Prior to this, the pallet is set on the guideway by the actuator, an oil-pressure jack, etc. The surface of the road leading to the pallet is flat and level as to provide no hindrance or obstruction when the vehicle mounts the pallet.

The following is a brief explanation of the figures.

Figure 2:
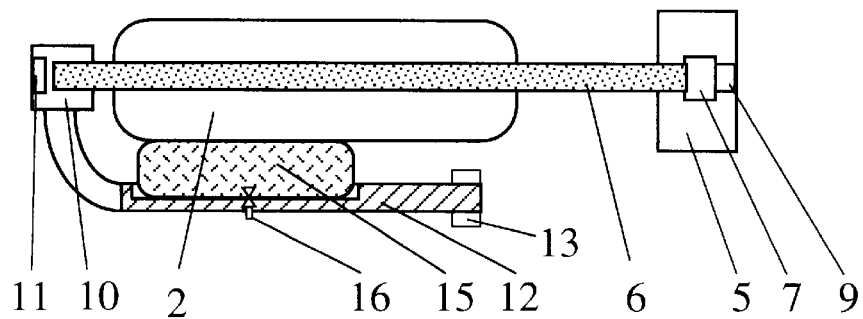
Figure 3:
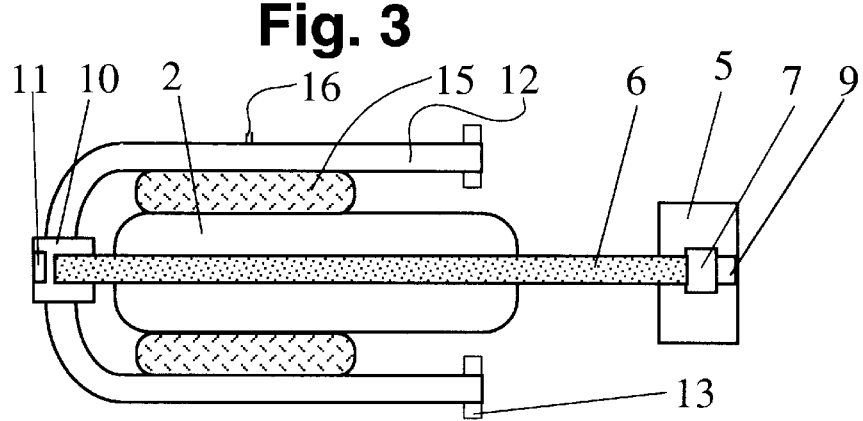
Figure 4:
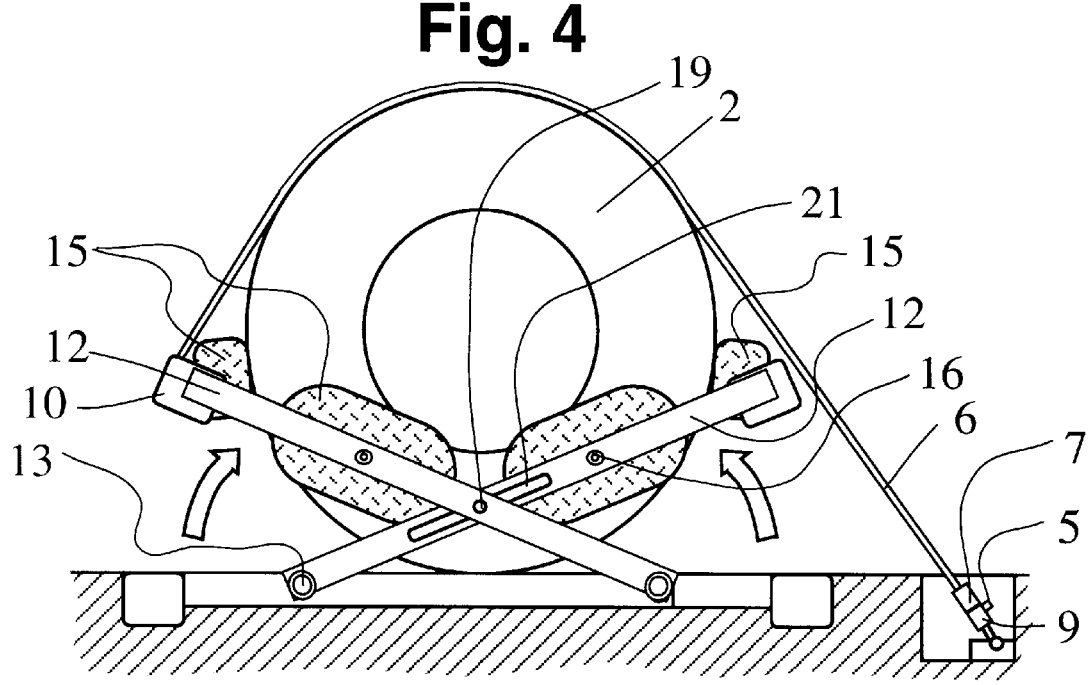
Figure 5:
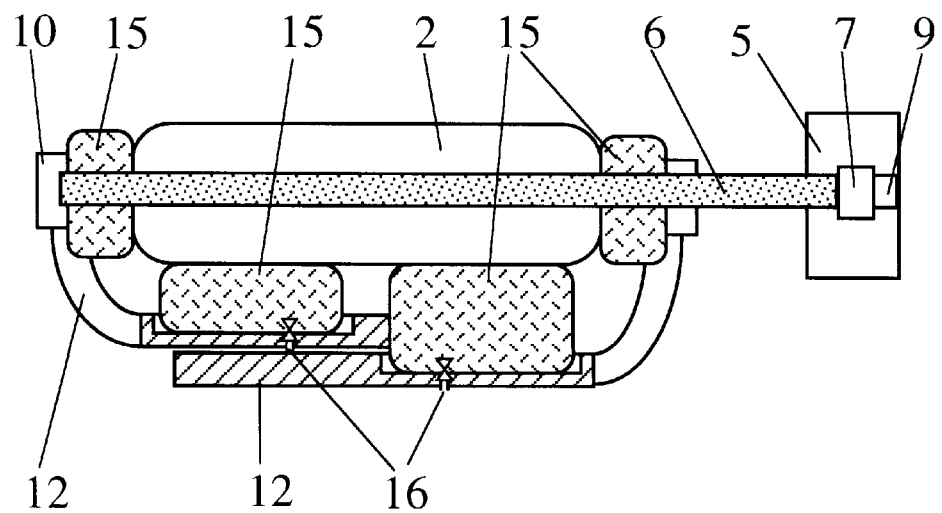
Figure 6:
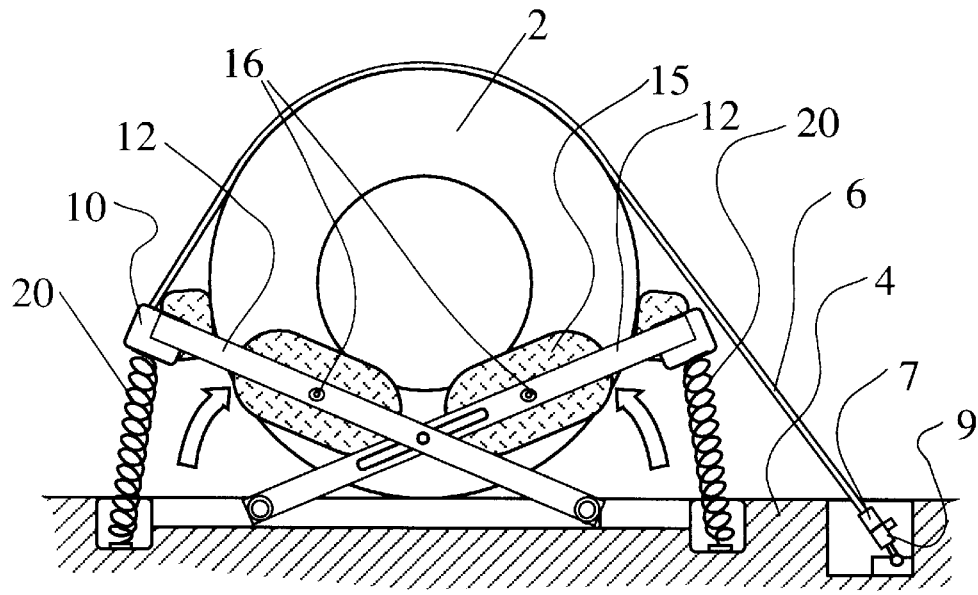
Figure 7:
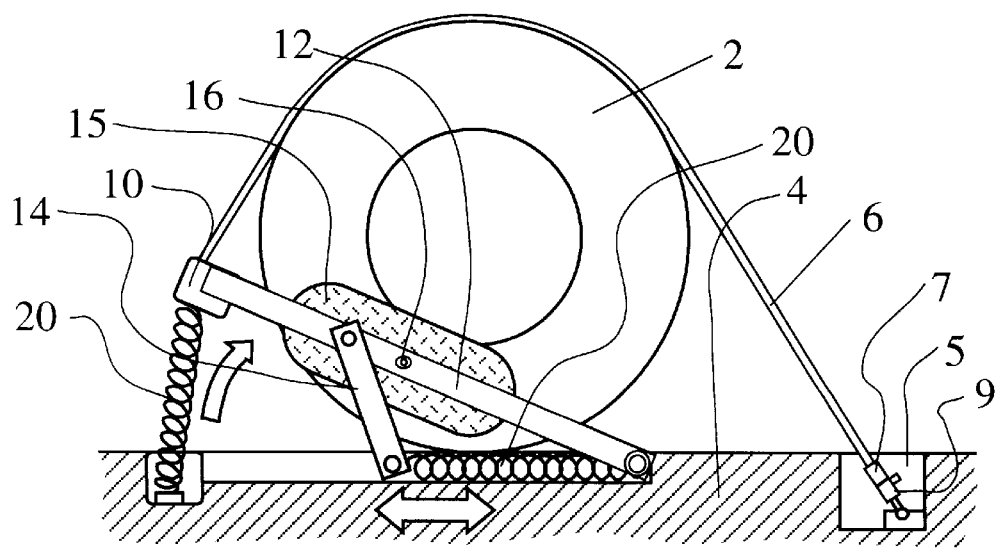
Figure 8:
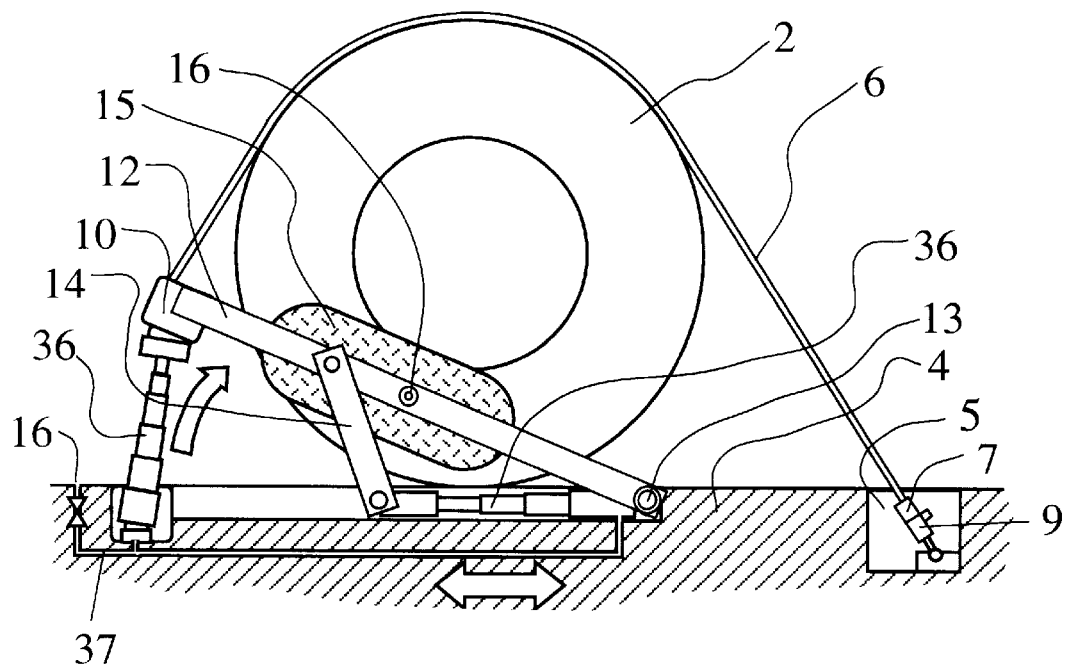
Figure 9:
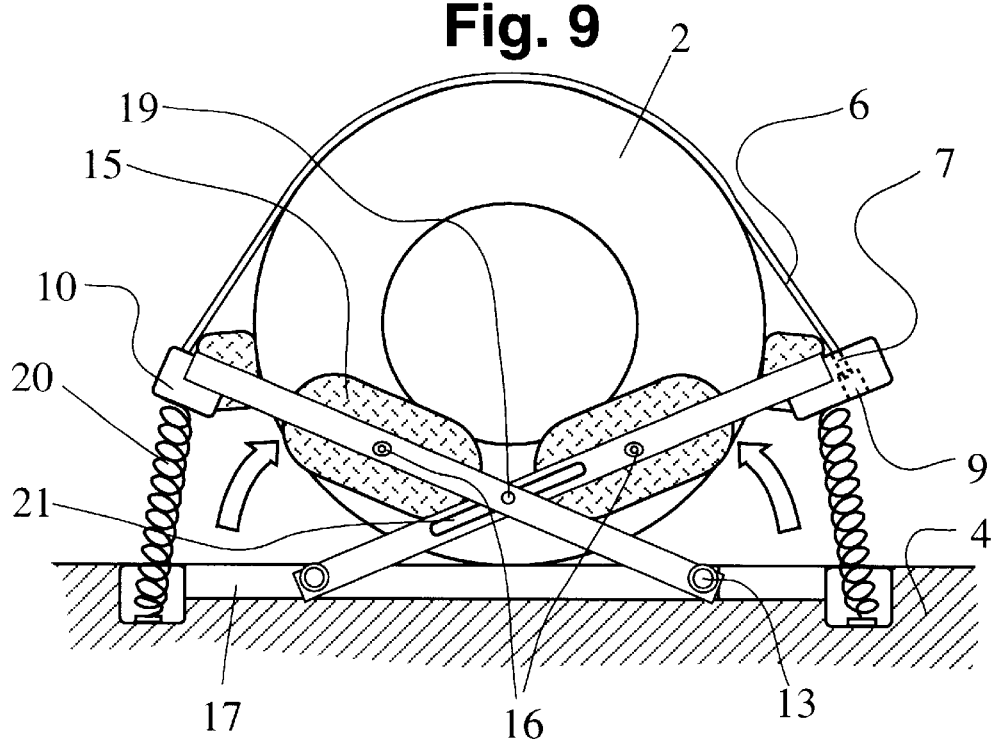
Figure 10:
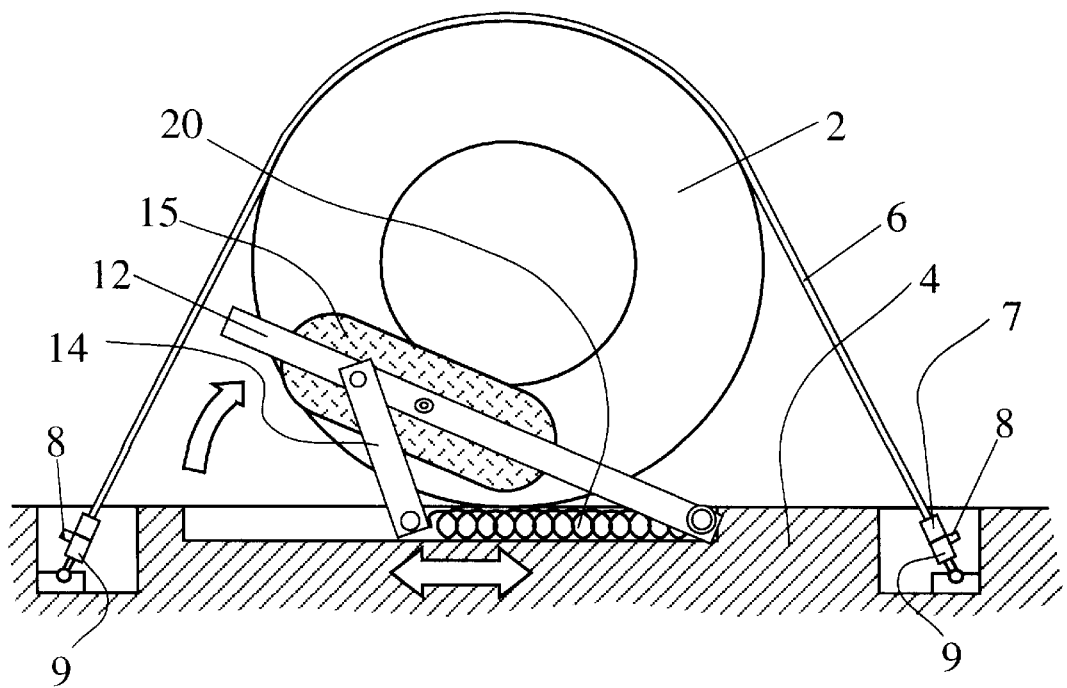
Figure 11:
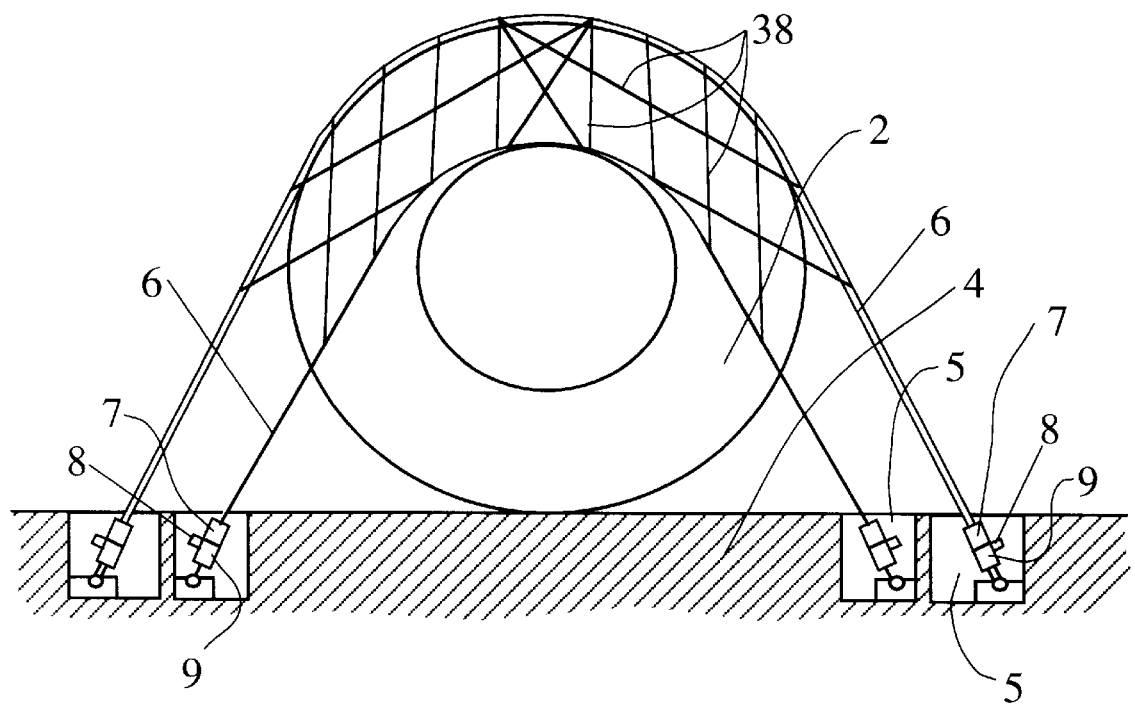
Figure 12:
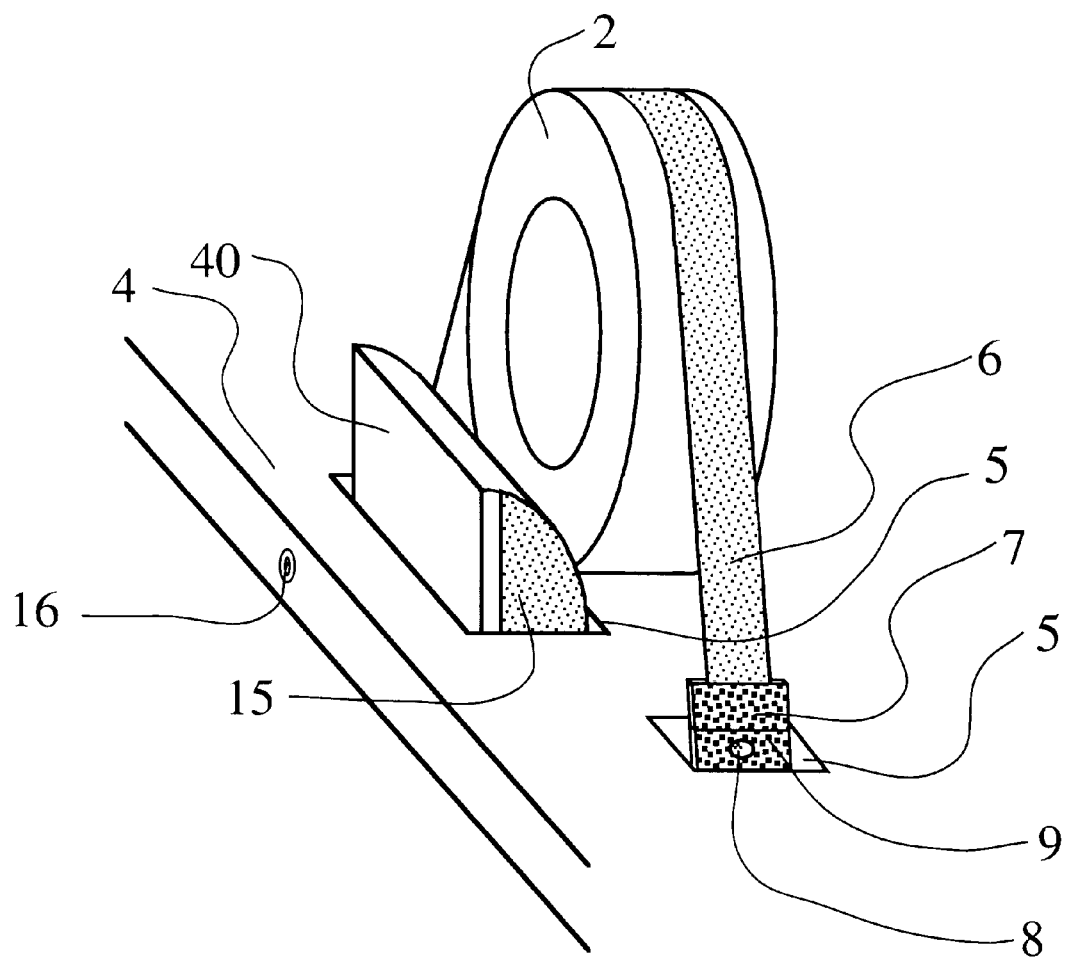
Figure 13:
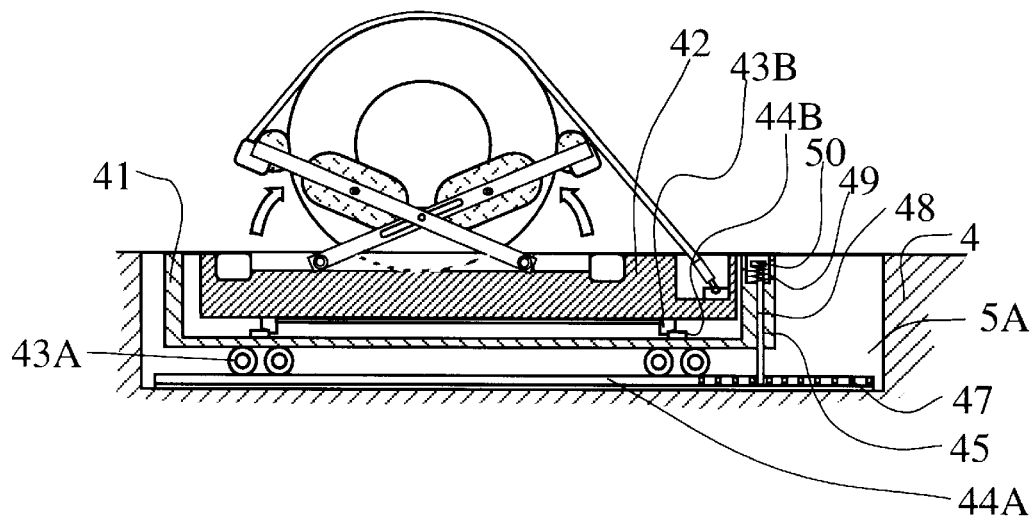
Figure 14:
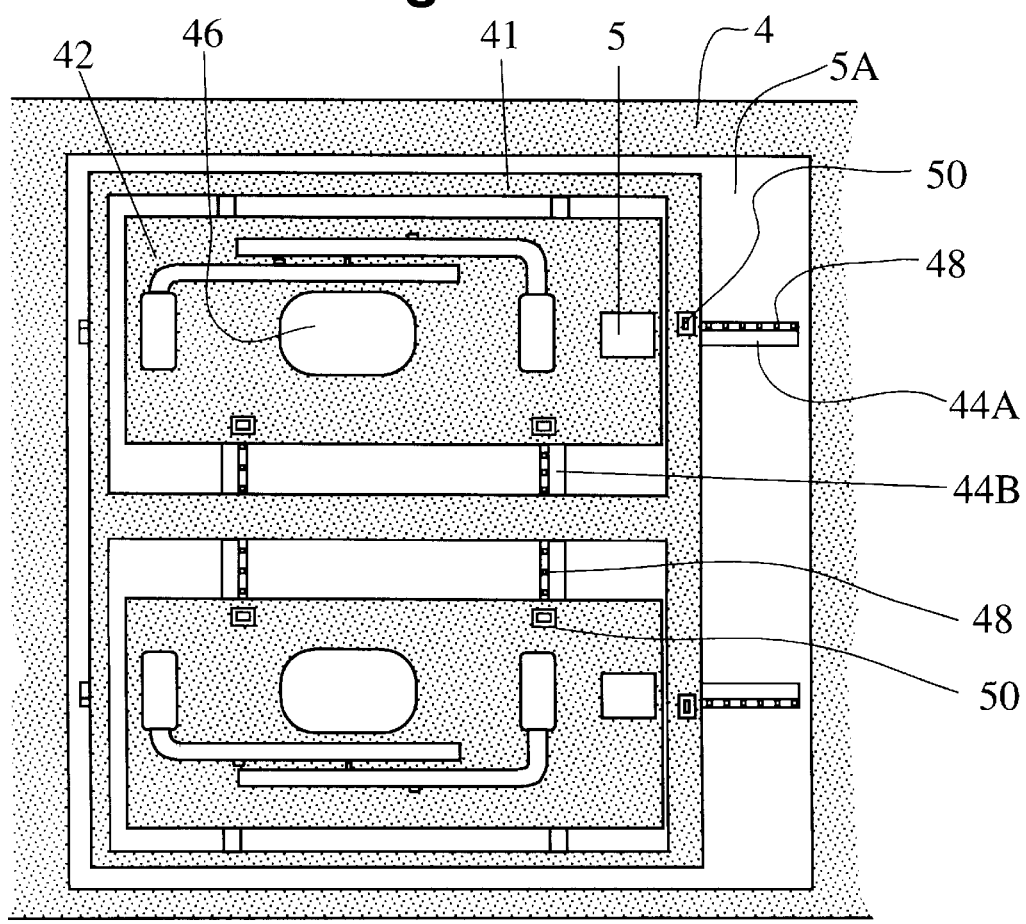
Figure 15:
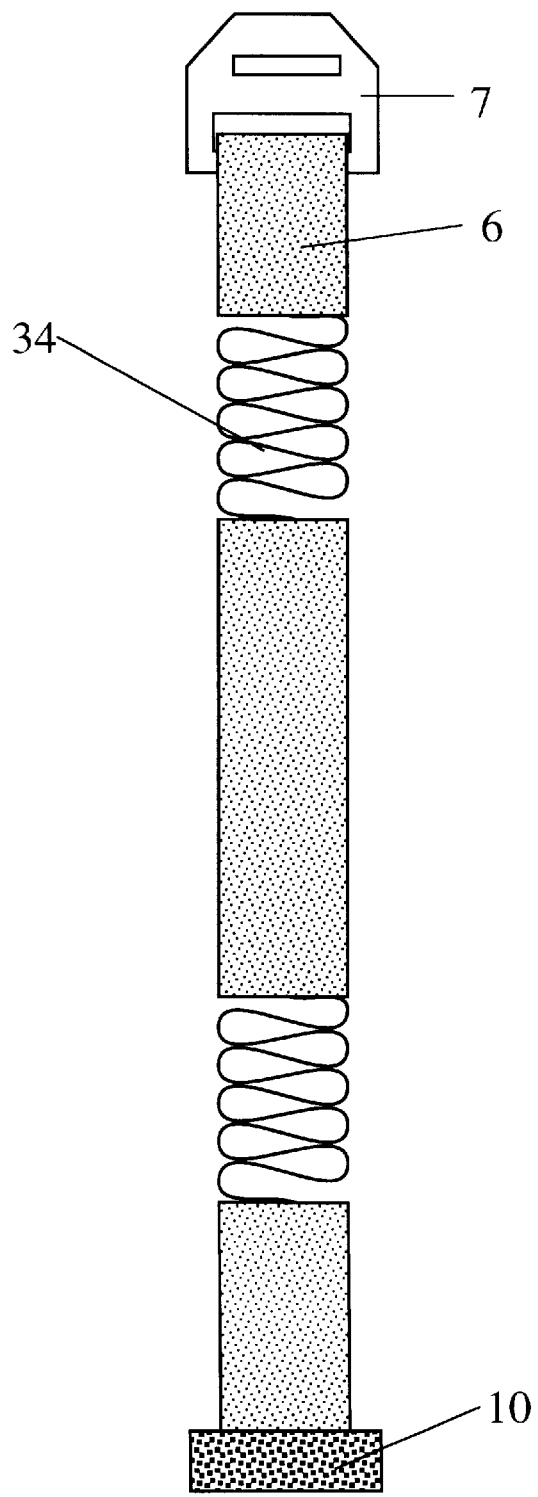
Figure 16:
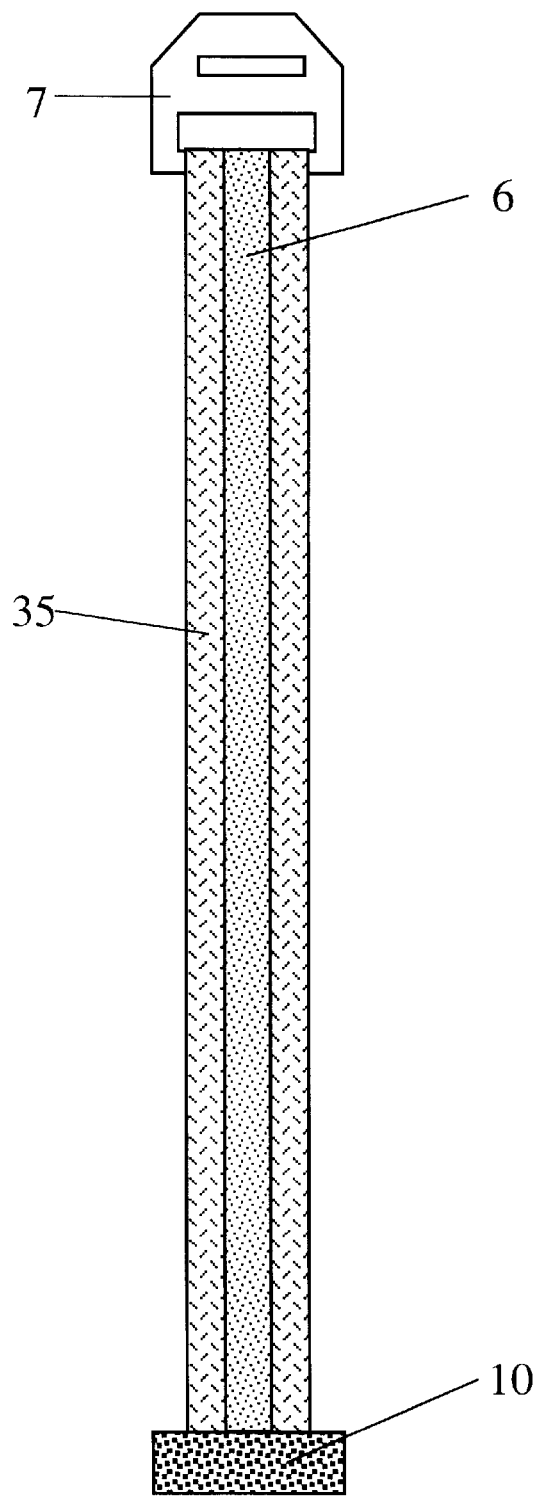
Figure 17:
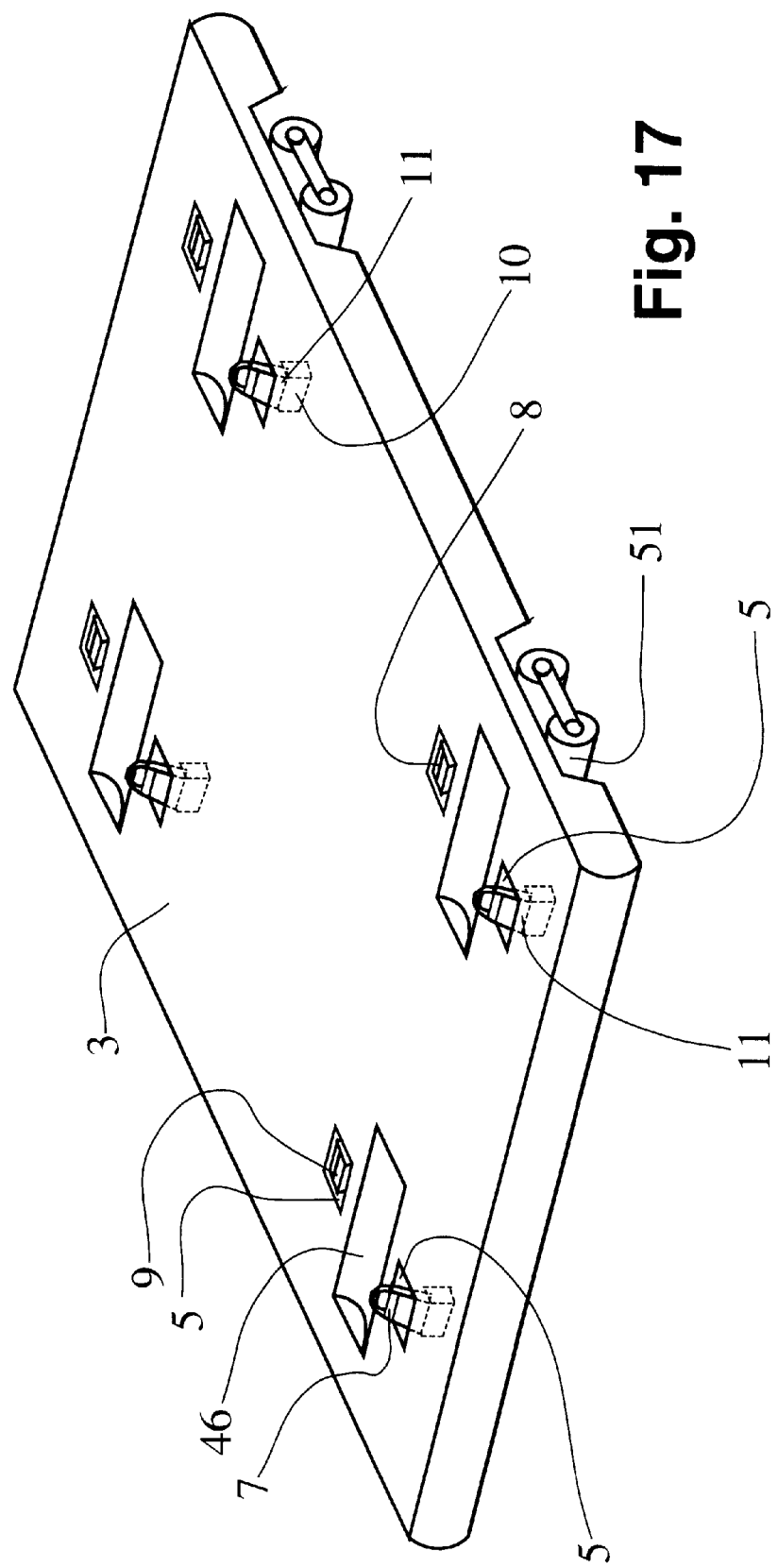
Figure 18:
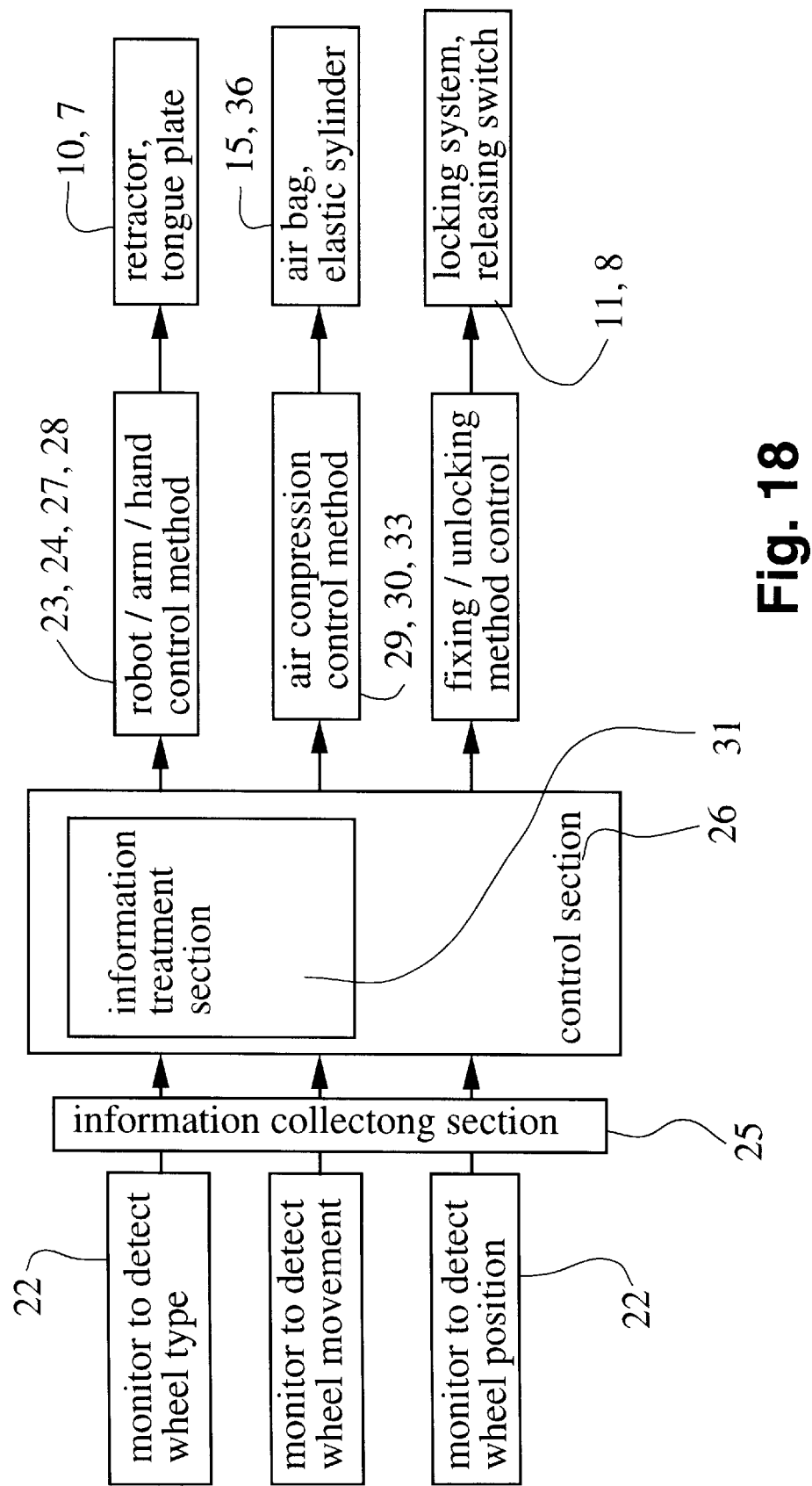
Figure 19:
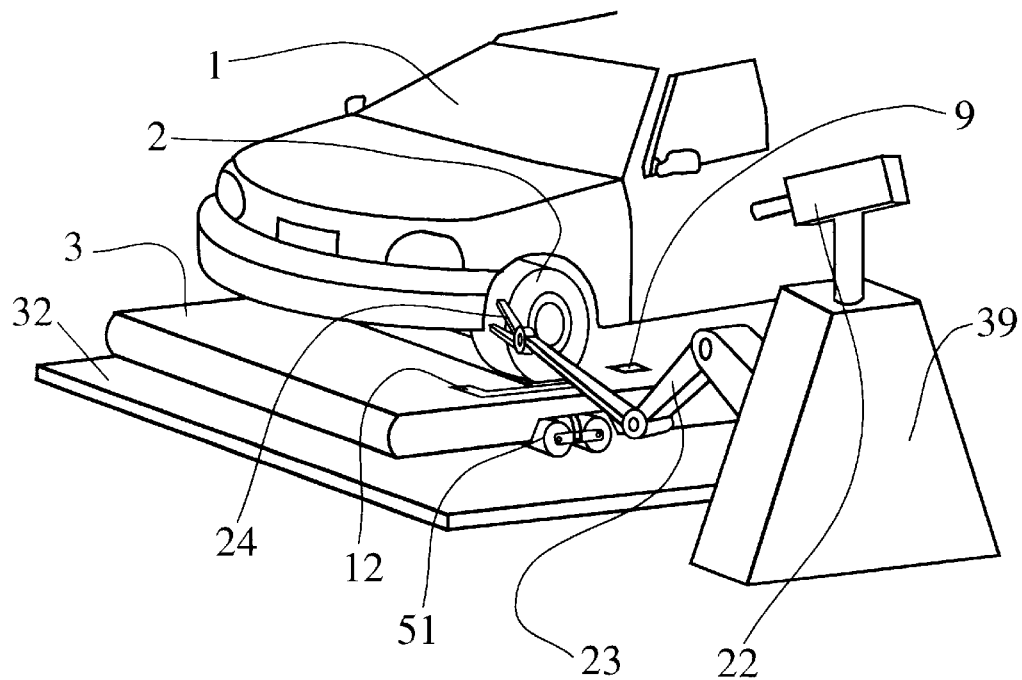
Figure 20:
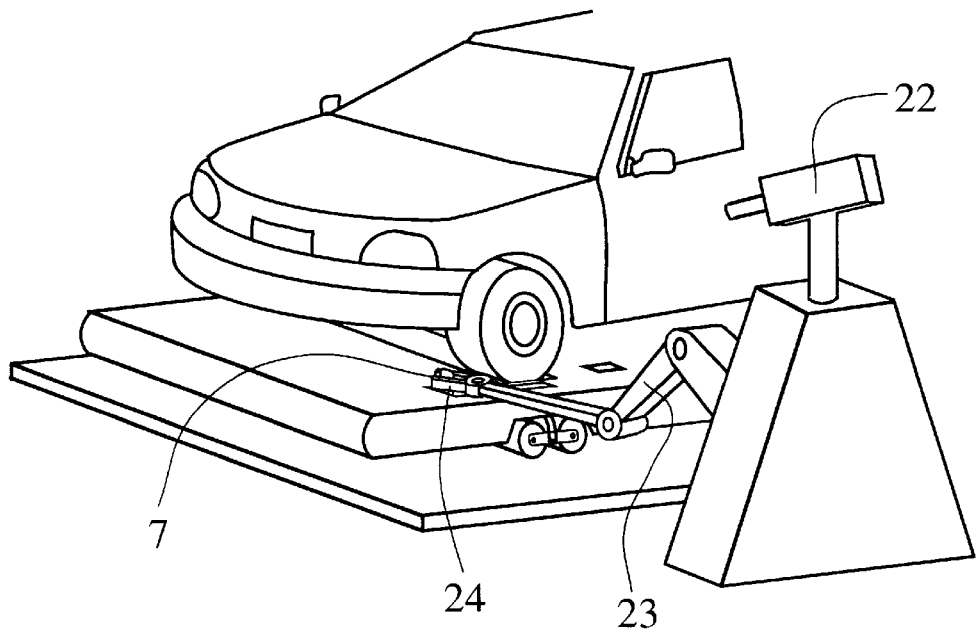
Figure 21:
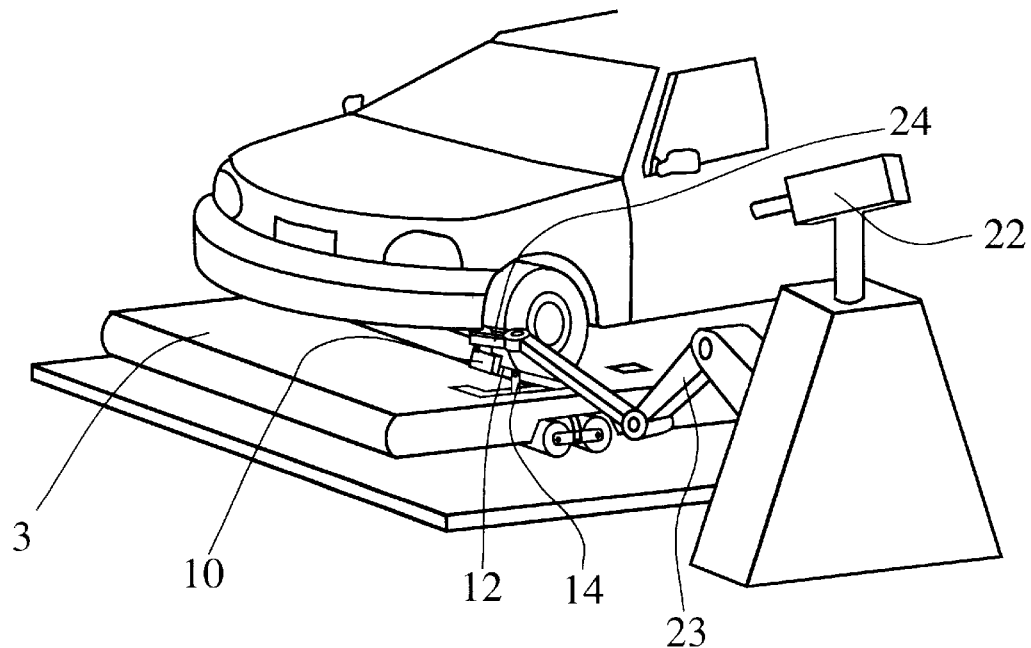
Figure 22:
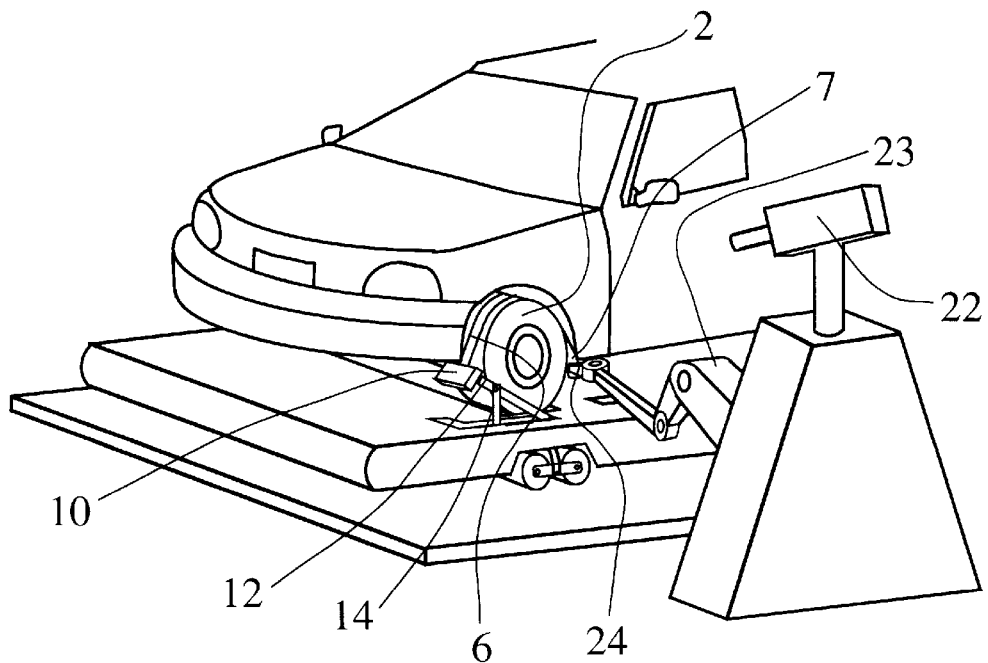
Figure 23:
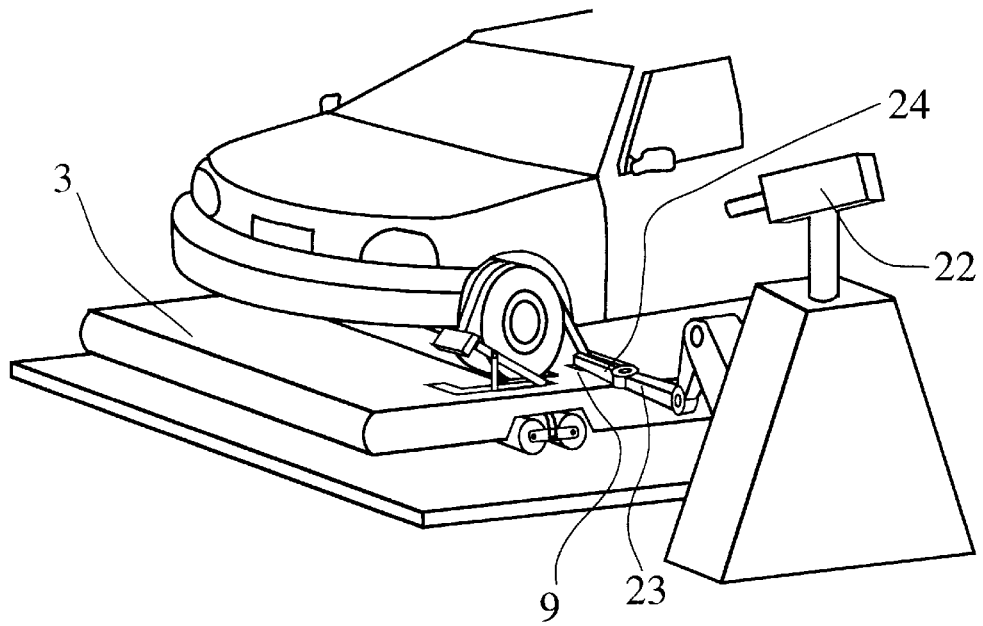
Figure 24:
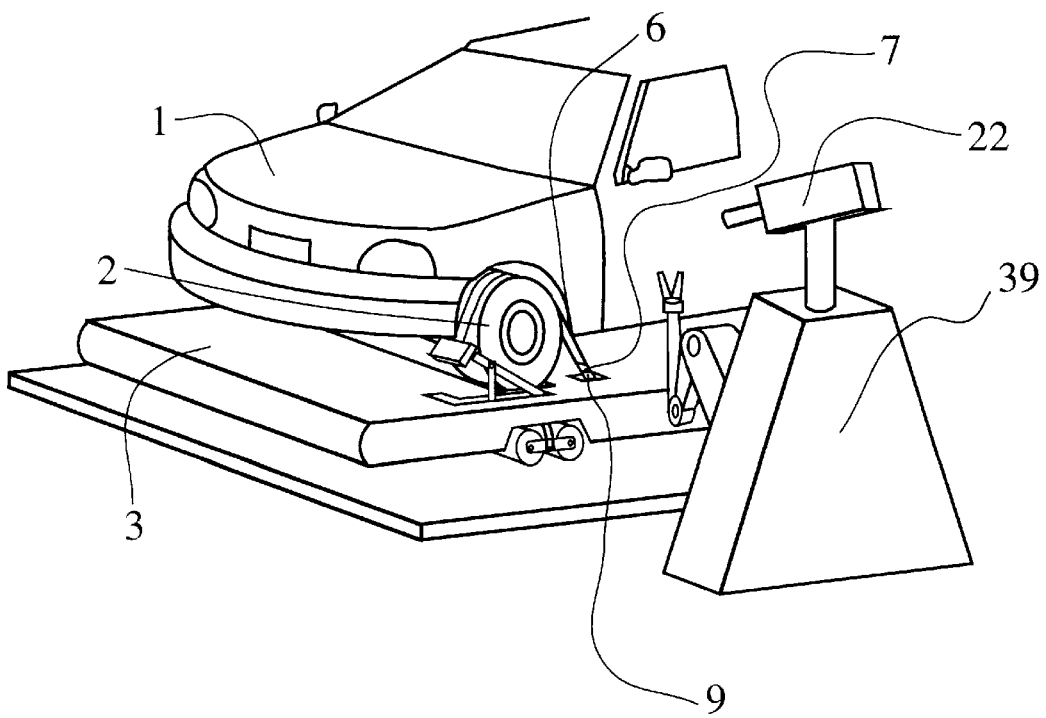
Figure 25:
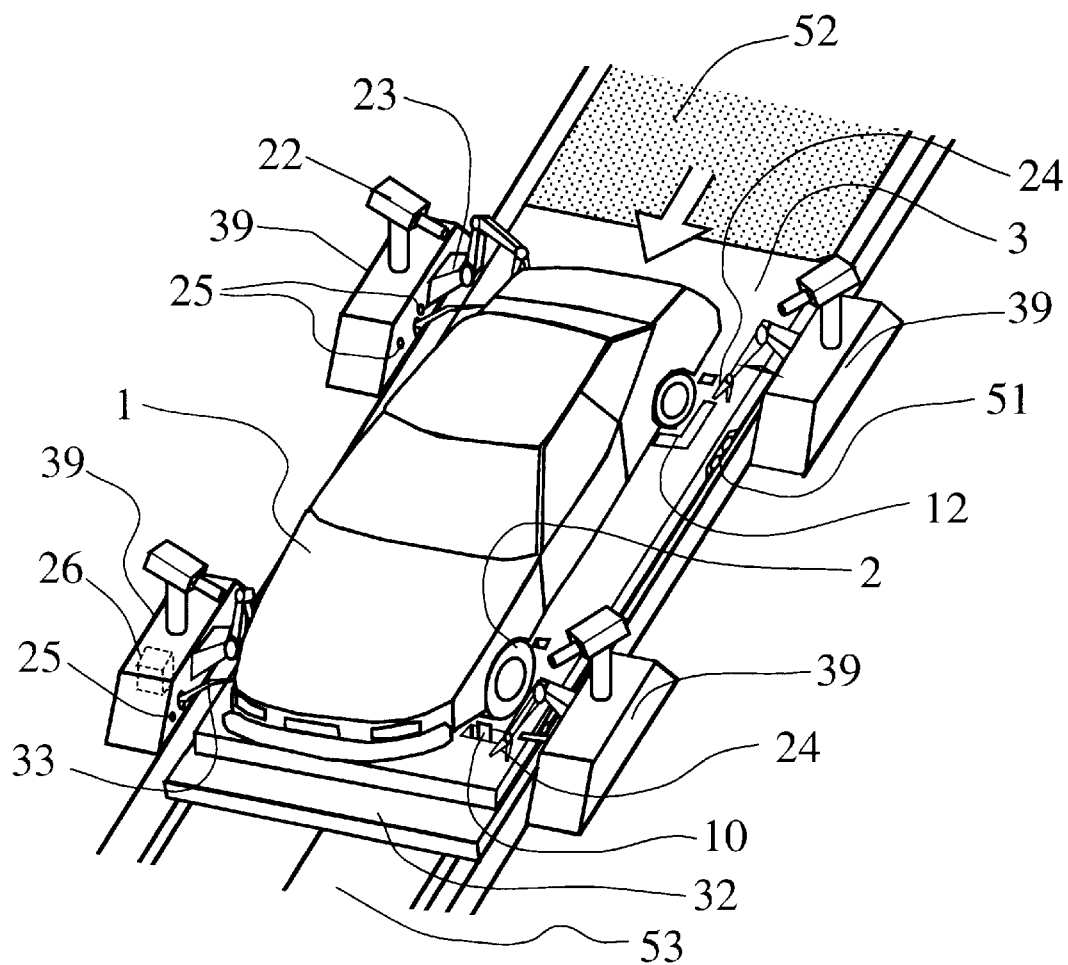

1. FIG. 1 shows a side view of the wheel fixing apparatus.
2. FIG. 2 is a plan which shows the upper view of the wheel fixing apparatus.
3. FIG. 3 is a plan which shows the upper view of the wheel fixing apparatus.
4. FIG. 4 shows a side view of the wheel fixing apparatus.
5. FIG. 5 is a plan which shows the upper view of the wheel fixing apparatus.
6. FIG. 6 shows a side view of the wheel fixing apparatus.
7. FIG. 7 shows a side view of the wheel fixing apparatus.
8. FIG. 8 shows a side view of the wheel fixing apparatus.
9. FIG. 9 shows a side view of the wheel fixing apparatus.
10. FIG. 10 shows a side view of the wheel fixing apparatus.
11. FIG. 11 shows a side view of the wheel fixing apparatus.
12. FIG. 12 shows a bird's eye view of the wheel fixing apparatus.
13. FIG. 13 shows a side view of the wheel fixing apparatus which is attached to the position adjustment apparatus.
14. FIG. 14 shows a side view of the wheel fixing apparatus which is attached to the position adjustment apparatus.
15. FIG. 15 shows a plan which shows the belt and tongue plate(stopper).
16. FIG.16 shows a plan which shows the belt and tongue plate(stopper).
17. FIG. 17 shows a bird's eye view of the pallet.
18. FIG. 18 is a block diagram which shows a procedure of the fixing operation.
19. FIG. 19 is a bird's eye view which shows a method of fixation by the fully automated wheel fixing apparatus.
20. FIG. 20 is a bird's eye view which shows a method of fixation by the fully automated wheel fixing apparatus.
21. FIG. 21 is a bird's eye view which shows a method of fixation by the fully automated wheel fixing apparatus.
22. FIG. 22 is a bird's eye view which shows a method of fixation by the fully automated wheel fixing apparatus.
23. FIG. 23 is a bird's eye view which shows a method of fixation by the fully automated wheel fixing apparatus.
24. FIG. 24 is a bird's eye view which shows a method of fixation by the fully automated wheel fixing apparatus.
25. FIG. 25 is a bird's eye view of the mode-interchange.

THE BEST EXPRESSION OF THE INVENTION

FIG. 1 shows the front view adjacent the tire (wheel) 2.

The tire (wheel) 2 of the automobile is riding on the fixing floor 4 for the tire (wheel). The fixing floor 4 for the tire (wheel) is such a floor of the pallet or ship, freight car and so on, to which the tire (wheel) is fixed. The wheel side support apparatus 12 is installed in the box 17 for furnishing the wheel side support apparatus. One end of the wheel side support apparatus 12 is fixed and connected to the fixing floor 4 for the tire (wheel) 2 by the hinge 13. The wheel side support apparatus 12 has an air bag 15 attached to it, and the injection inlet 16 is installed on the wheel side support apparatus 12 to inject the gases (air). In this figure, the air bag 15 is inflated by injected gases (air), however, when the wheel side support apparatus 12 is put into the fixing floor 4 for the tire (wheel) 2, the air bag is put into the side of the wheel side support apparatus 12. The retractor 10 is installed on the one side of the end of the wheel side support apparatus 12, also the lock system 11 is attached there. The lock system 11 is to lock the movement of the belt 6 which is pulled out the retractor 10. Once the fixing of the wheel is done, the lock system will not allow the belt to be pulled any further. In operation, the belt 6 is pulled out from the retractor 10, the belt 6 is then rolled over the tire (wheel) 2. The tongue plate (stopper) 7 is installed on one end of the belt 6. In this figure, the tongue plate (stopper) 7 is shown already inserted into the buckle (anchor) 9 and locked. The belt 6 is shown rolled over the upper half portion of the tire (wheel) 2, and pushing down on the tire (wheel) 2. Also, the tongue plate (stopper) 7, which is set on the end of the belt 6, is shown locked in the buckle (anchor) 9 which is placed at the hole 5 in the fixing floor 4. Releasing switch 8 is installed on the buckle (anchor) 9. This switch is used when the tongue plate (stopper) 7 needs to be released from the buckle (anchor) 9. The wheel side support apparatus 12 pops up to prevent the lateral sliding of the tire (wheel) 2. The reinforcement member 14 reinforces stiffness of the wheel side support apparatus 12, and together with the wheel side support apparatus 12, prevents the lateral sliding of the tire (wheel) 2. Generally, automobiles have four tires (wheels) each, therefore, when each tire (wheel) is stabilized by a wheel side support apparatus, the tire (wheel) 2 is prevented from sliding on both the right and left side. The reinforcement hinge 18 is installed on the reinforcement member 14. One of the hinges on the reinforcement hinge 18 is movable within the sliding slot 21. While the wheel side support apparatus 12 is not in use, it is stored in the floor 4. When the wheel side support apparatus 12 is needed, one end is lifted up and the attached belt 6 is pulled out from the retractor 10. The wheel side support apparatus 12, buckle (anchor) 9 and all of the equipment is placed in the floor 4. Thus, the floor 4 becomes totally flat when the tire (wheel) 2 is rolling over it.

FIG. 2 shows a plan view of the tire (wheel) 2 fixing apparatus. The wheel side support apparatus 12 is installed on the floor 4 and connected to the pallet 3 by the hinge 13. The wheel side support apparatus includes an "L"-shaped bar that is installed beside the tire (wheel) 2 to prevent the movement of the tire (wheel) 2 both laterally and longitudinally. The belt 6 is pulled out from the retractor 10. The tongue plate (stopper) 7, which is attached on the end of the belt 6, is then locked in the buckle (anchor) 9. The buckle (anchor) 9 is installed in the internal box 5. The air bag 15 is installed on the side of the wheel side support apparatus 12, and is inflated between the wheel side support apparatus 12 and the tire (wheel) 2. This fixes the tire (wheel) 2 more firmly by pushing it from the lateral direction with the air pressure in the air bag 15. Also, the air inlet 16 is installed on the side of the wheel side support apparatus to inject the compressed air into the air bag 15.

FIG. 3 shows a plan view of the tire (wheel) fixing apparatus.

The wheel side support apparatus 12 is connected to the pallet 3 by the hinge 13, and is installed so as to surround the tire (wheel) 2. The wheel side support apparatus 12 includes a "U"-shaped bar, and is installed beside the tire (wheel) 2 to prevent the movement of the tire (wheel) both laterally and longitudinally. The belt 6 is pulled out from the retractor 10. The tongue plate (stopper) 7, which is attached on the end of the belt 6, is then locked in the buckle (anchor) 9. The buckle (anchor) 9 is installed in the internal box 5. The air bag 15 is installed on the side of the wheel side support apparatus 12, and is inflated between the wheel side support apparatus and the tire (wheel) 2. This fixes the tire (wheel) 2 more firmly by pushing from the lateral direction with the air pressure in the air bag 15. Also, the air inlet 16 is installed on the side of the wheel side support apparatus 12 to permit injection of compressed air into the air bag 15.

FIG. 4 shows a side view of the tire (wheel) fixing apparatus.

Two of the wheel side support apparatus 12 are installed so that they can clamp the tire (wheel) 2. Each wheel side support apparatus 12 is able to open and close at the point on the hinge 13 acting as a fulcrum. Each wheel side support apparatus 12 includes an "L"-shaped bar and is installed beside the tire (wheel) 2 to prevent the movement of the tire both laterally and longitudinally. Each wheel side support apparatus is connected to the movable hinge 19, and the hinge 19 is able to slide within the slot of the slide 21. The belt 6 is pulled out from the retractor 10. The tongue plate (stopper) 7, which is attached on the end of the belt 6, is then locked in the buckle (anchor) 9 which is installed in the internal box 5 in the floor 4. The buckle (anchor) 9 is installed in the inside box 5. Four air bags 15 are installed on the inside of the wheel side support apparatus 12, two are installed on the side of the wheel side support apparatus and two are installed at the end of the retractor 10. They are inflated between the wheel side support apparatus and the tire (wheel) 2. They fix the tire (wheel) 2 more firmly by pushing it laterally with the air pressure in the air bag 15. Also, the air inlet 16 is installed on the side of the wheel side support apparatus to inject the compressed air to the air bag 15. In this case, the tire (wheel) 2 is firmly fixed on the floor 4 of the pallet by the wheel side support apparatus 12 and the belt 6 as they clamp the tire (wheel).

FIG. 5 shows a plan view of the tire (wheel) 2 which is fixed on the floor by the wheel fixing apparatus of FIG. 4.

Two of the wheel side support apparatus 12 are installed so that a horizontal bar is positioned in front and behind the tire (wheel) 2. Each wheel side support apparatus 12 is able to open and close at the point on the hinge acting as a fulcrum. Each wheel side support apparatus 12 includes an "L"-shaped bar, and is installed on the same side of the tire (wheel) 2 to prevent the movement of the tire (wheel) 2 both laterally and longitudinally. The belt 6 is pulled out from the retractor 10. The tongue plate (stopper) 7, which is attached on the end of the belt 6, is locked in the buckle (anchor) 9 which is installed in the internal box 5 in the floor 4. Four air bags 15 are installed on the inside of the wheel side support apparatus 12. Two of those are installed on the side of the wheel side support apparatus 12 and two are installed at the ends of the "L"-shaped bars. They are inflated between the wheel side support apparatus 12 and the tire (wheel) 2. They fix the tire more firmly by pushing laterally with the air pressure in the air bag 15. Also, the air inlet 16 is installed on the side of the wheel side support apparatus 12 to permit injection of compressed air into the air bag 15. In this case, the tire (wheel) 2 is firmly fixed on the floor 4 of the pallet by two of the wheel side support apparatus 12 and the belt 6 as they clamp the tire (wheel) 2.

FIG. 6 shows the side view of another embodiment of the tire (wheel) fixing apparatus.

Two of the wheel side support apparatus 12 are installed so that a horizontal bar is positioned in front and behind the tire (wheel) 2. Each wheel side support apparatus 12 is able to open and close at a point on the hinge acting as a fulcrum. Each wheel side support apparatus 12 includes an "L"-shaped bar and is installed on the same side of the tire (wheel) 2 to prevent the movement of the tire both laterally and longitudinally. Each wheel side support apparatus has a retractor 10. The belt 6 is pulled out from the retractor 10. The tongue plate (stopper) 7, which is attached on the end of the belt 6, is then locked in the buckle (anchor) 9 which is installed in the internal box 5 in the floor 4. Each wheel side support apparatus 12 has a spring 20 which pulls the wheel side support apparatus 12 back into the floor. Four air bags 15 are installed on the inside of the wheel side support apparatus 12. Two of those are installed on the side of the wheel side support apparatus 12, and two are installed at the end of the "L"-shaped bars, and are inflated between the wheel side support apparatus and the tire (wheel) 2. They fix the tire (wheel) 2 more firmly by pushing it laterally with the air pressure in the air bag 15. Also, the air inlet 16 is installed on the side of the wheel side support apparatus 12 to inject the compressed air to the air bag 15. In this case, the tire (wheel) 2 is firmly fixed on the floor 4 of the pallet by two of the wheel side support apparatus 12 and the belt 6 as they clamp the tire (wheel) 2.

FIG. 7 shows the side view of another embodiment of the wheel fixing apparatus which fixes the tire (wheel) 2.

A wheel side support apparatus 12 is installed on the side of the tire (wheel) 2. The wheel side support apparatus 12 is able to open and close at a point on the hinge acting as a fulcrum. The wheel side support apparatus 12 includes an "L"-shaped bar, and is installed on the side of the tire (wheel) 2 to prevent the movement of the tire both laterally and longitudinally. The belt 6 is pulled out from the retractor 10, the tongue plate (stopper) 7, which is attached on the end of the belt 6, is then locked in the buckle (anchor) 9 which is installed in the internal box 5 in the floor 4. The air bags 15 are installed on the inside of the wheel side support apparatus 12. One of these is installed on the side of the wheel side support apparatus 12 at the end of the retractor 10 and is inflated between the wheel side support apparatus 12 and the tire (wheel) 2. This fixes the tire (wheel) 2 more firmly by pushing it laterally with the air pressure in the air bag 15. The air inlet 16 is installed on the side of the wheel side support apparatus to inject the compressed air into the air bag 15. Also, the wheel side support apparatus and reinforcement member 14 have pull back spring 20 which functions to pull back reinforcement member 14 when the wheel side support apparatus must be set in the floor.

FIG. 8 shows the side view of a further embodiment of the wheel fixing apparatus which fixes the tire (wheel) 2.

A wheel side support apparatus 12 is installed on the side of the tire (wheel) 2. The wheel side support apparatus 12 is able to open and close at a point on the hinge 13 acting as a fulcrum. The wheel side support apparatus 12 includes an "L"-shaped bar, and is installed on the side of the tire (wheel) 2 to prevent the movement of the tire (wheel) 2 both laterally and longitudinally. The wheel side support apparatus has two elastic cylinders 36. The elastic cylinder 36 pushes up the wheel side support apparatus 12 using the hinge 13 as a fulcrum when actuated by compressed air. The compressed air is transferred to the elastic cylinders 36 for the reinforcement member 14 through the air inlet 16 and the air pipe 37. The belt 6 is pulled out from the retractor 10. The tongue plate (stopper) 7, which is attached on the end of the belt 6, is then locked in the buckle (anchor) 9 which is installed in the inside box in the floor 4. The buckle (anchor) 9 is installed in the internal box 5. The air bags 15 are installed on the inside of the wheel side support apparatus 12. One of these is installed on the side of the wheel side support apparatus 12 at the end of the retractor 10, and is inflated between the wheel side support apparatus 12 and the tire (wheel) 2. This fixes the tire (wheel) 2 more firmly by pushing it laterally with the air pressure in the air bag 15. The air inlet 16 is installed on the side of the wheel side support apparatus into inject the compressed air to the air bag 15.

FIG. 9 shows the side view of still another embodiment of the wheel fixing apparatus which fixes the tire (wheel) 2.

Two of the wheel side support apparatus 12 are installed so that their horizontal bar is positioned in front and behind the tire (wheel) 2. These clamp onto the tire (wheel) 2. Each wheel side support apparatus 12 includes an "L"-shaped bar, and installed on the same side of the tire (wheel) 2 to prevent the movement of the tire both laterally and longitudinally. One of the wheel side support apparatus has a retractor 10 on the end of the bar, and the other one has a buckle (anchor) 9 on the end of the bar. The belt 6 is pulled out from the retractor 10 which is installed on one of the wheel side support apparatus 12. The tongue plate (stopper) 7, which is attached on the end of the belt 6, is then locked in the buckle (anchor) 9 which is installed on the end of the other wheel side support apparatus. Each wheel side support apparatus 12 is connected to the floor 4 by the hinge 13. Each wheel side support apparatus 12 is able to open and close using the point on the hinge 19 as a fulcrum. When the wheel side support apparatuses 12 are stored in the floor 4, the wheel side support apparatuses 12 are pushed down into the settling ditch 17. The buckle 9 is installed in the internal box 5. Each wheel side support apparatus has a pulling back spring 20 to set the wheel side support apparatus in the settling ditch 17. Four air bags 15 are installed on the inside of the wheel side support apparatus 12, two of those are installed on the side of the wheel side support apparatus at the end of the retractor 10. They are inflated between the wheel side support apparatus and the tire (wheel) 2. They fix the tire more firmly by pushing laterally with the air pressure of the air bag 15. Also, the air inlet 16 is installed on the side of the wheel side support apparatus 12 to permit injection of compressed air into the air bag 15. In this case, the tire 2 is firmly fixed to the floor 4 of the pallet by two of the wheel side support apparatus 12 and the belt 6 as they clamp the tire (wheel) 2.

FIG. 10 shows the side view of a further embodiment of the wheel fixing apparatus which fixes the tire (wheel) 2.

A wheel side support apparatus 12 is installed on the side of the tire (wheel) 2. The wheel side support apparatus 12 is able to open and close using the point on the hinge 15 as a fulcrum. The wheel side support apparatus 12 includes an "I"-shaped bar, and is installed on the side of the tire (wheel) 2 to prevent the movement of the tire laterally. The tongue plate (stopper) 7, which is attached on the end of the belt 6, is then locked in buckle (anchor) 9, which is installed in the inside box 5 in the floor 4. The buckle (anchor) 9 is installed in the internal box 5 to provide a smooth surface on the floor 4. Also, the buckle (anchor) 9 has the releasing switch 8, to release the tongue plate (stopper) 7 from the buckle 9. The air bags 15 are installed on the inside of the wheel side support apparatus 12. One of these is installed on the side of the wheel side support apparatus 12. And is inflated between the wheel side support apparatus 12 and the tire (wheel) 2. This fixes the tire (wheel) 2 more firmly by pushing laterally with the air pressure of the air bag 15. The reinforcement member 14 has the pulling back spring 20. The air inlet 16 is installed on the side of the wheel side support apparatus to permit injection of compressed air into the air bag 15. In this case, after the end of the wheel side support apparatus is raised up, the air bag 15 is inflated to fit the wheel side support apparatus 12 to the tire (wheel) 2 closely. This maintains the position of the wheel side support apparatus. The belt 6 rolls over the tire (wheel) 2 and is fixed on both sides with tongue plates (stoppers) 7.

FIG. 12 shows the bird's eye view of a still further embodiment of the wheel fixing apparatus which fixes the tire (wheel) 2.

In this case, a pop-up wheel side support apparatus 40 is installed on the floor on the side of the tire (wheel) 2. The pop-up wheel side support apparatus 40 protrudes at 90 degrees, perpendicular to the motion direction of the tire (wheel) 2. Using the air bag 15, this supports the side of the tire (wheel) 2. The pop-up wheel side support apparatus 40 and the belt 6 are separately installed on the floor 4. The belt 6 is pulled out and rolled down the tire (wheel) 2, then the tongue plate (stopper) 7, which is attached on the end of the belt 6, is then locked in the buckle (anchor) 9 which is installed internal box 5 in the floor 4. The buckle (anchor) 9 has the releasing switch 8, this releases the tongue plate (stopper) 7. The air inlet 16 is installed on the side of the floor 4 to which the tire (wheel) is fixed, to permit injection of the compressed air into the air bag 15.

FIG. 13 shows the side cross section of the wheel fixing apparatus which has the ability to adjust the position of the apparatus.

In the floor 4 for fixing the tire (wheel), a box 5A is installed. In the box 5A, the adjusting rail 44A for the longitudinal direction and the lock hole 47 for the rail are installed. The wheels 43A for longitudinal adjusting run on the adjusting rail 44 and support the wheel base adjusting board 41. In the wheel base adjusting system, other wheels 43B for longitudinal adjusting are installed and run on the adjusting rail 44B. Also, the lock hole 45 for locking the rail lock stick 48 is installed in the wheel base adjusting board 41 and support the adjusting board 42 which adjusts the inter wheel distance. The wheel fixing apparatus is installed in the board 42 in between the tires 2. On the longitudinal adjusting rail 44A, the lock hole 47 for the rail is installed. The rail lock stick 48 is fitted into the hole. When the wheel base plate 41 is positioned in the desired location, the rail lock stopper 50 is raised, then the rail lock stick 48 is put down to lock it by the spring 49 which is installed above the stick 48. In this case, the positioning is performed by the method of the rail lock system. However, this is not the only method for positioning, there are some other systems such as using the ball screw method.

FIG. 14 shows the upper view of the tire (wheel) fixing apparatus of FIG. 13 which has a wheel positioning ability.

In the floor 4 for fixing the wheel, a box 5A is installed. In the box 5A, adjusting rail 44A for longitudinal direction and lock hole 47 for rail are installed. The wheels 43A for longitudinal adjusting (not shown) run on the adjusting rail 44A and support the wheel base adjusting board 41. On the wheel base adjusting board 41 the hole 45 (see FIG. 13) for the rail lock stick 48 is installed, this sustains the boards 42 which maintain the distance between the both right and left side of the wheel. In the board 42, the wheel fixing apparatus is installed. On the length adjusting rail 44A, the rail lock holes 47 are installed. The rail lock stick 48 is designed to fit into the rail lock holes 47. When the position of the wheel base adjusting board 41 is set in the desired position, the rail lock stopper 50 is raised, then the rail lock stick 48 is put down to lock it with the spring 49 which is installed about the stick 48. In this case, the positioning is performed by the method of rail lock system. However, this is not the only method to do positioning, there are some other systems such as using the ball screw method.

FIG. 15 shows a plan view of the belt 6 and tongue plate (stopper) 7.

The tongue plate (stopper) 7 is placed at the end of the belt 6. It is similar to the seat belt for passengers of an automobile and it is paired with a buckle 9 (see FIG. 2, for example). In this case, the belt 6 is pulled out from the retractor 10. Its material is made from the same fiber as the seat belt is. The tongue plate 7 has a hole for locking. Also, there are spring sections 34 in the belt which provide more tension for the belt itself to fix to the wheel more firmly.

FIG. 16 shows a plan view of another embodiment of the belt 6 and tongue plate (stopper) 7.

The tongue plate (stopper) 7 is placed at the end of the belt 6. It is similar to the seat belt for passengers of an automobile and it is paired with a buckle (not shown). In this case, the belt 6 is pulled out from the retractor 10, and its material is made from the same fiber as used in a seat belt. The tongue plate 7 has a hole for locking. Also, there is a tube section 35 in the belt. Compressed air is injected into the tube section 35 to inflate it to prevent the belt 6 slipping off the tire (wheel).

FIG. 17 shows a bird's eye view of the pallet 3.

The pallet 3 has four wheel fixing apparatuses (WFA), each has a pair of retractors 10 and the buckle (anchor) 9. These wheel fixing apparatuses are installed at the approximate locations of the tires (wheels) 2 of a vehicle. The retractor 10 and buckle (anchor) 9 are installed in the box 5 which is set in the floor 4 to be flat to not obstruct the rolling wheels of the vehicle being secured. The tongue plate (stopper) 7 is placed at the end of the belt 6. Each buckle (anchor) 9 has a releasing switch 8 to unlock the belt 6. Each retractor 10 has a locking system 11 to lock it automatically. In this case, the pallet carries passenger cars. However, to match the different types of automobiles, the relative positions of the retractor 10, buckle (anchor) 9, and box 5 should be adjusted accordingly. At the place the tire (wheel) is to be fixed, an indented section 46 is installed to prevent the tire's (wheel's) side-way slipping movement. On the pallet 3, the surface wheels of the pallet 51 are installed.

FIG. 18 shows the block diagram of the method of the wheel fixing by the automated apparatus of the present invention.

When the automobile arrives on the pallet, the type of automobile, the position and the conditions for carrying the automobile on the pallet are detected by the monitor 22. This information is sent to the collection section 25. Then, it is processed by the information treating section 31. Based on the results of the processing, the arm 23 of the robot is controlled and grasps the tongue plate (stopper) 7, which is located on the end of the belt 6, under control of the control module 26. The position of the grasped tongue plate (stopper) 7 is re-monitored by the monitor 22. Then, the re-monitored information from the monitor 22 feeds back to the control module 26. Then, the arm 23 and the hand 24 of the robot is controlled and manipulated further, as needed. The arm 23 and hand 24 of the robot form a grasping section 27 and pulling section 28.

The control module also regulates the compressed air so that the air from the compressed air tank 30 is injected into the air bag 15 using the injecting arm 33. The injecting arm 33 forms injection section 29.

The locking system II, which is installed within retractor 10, controls and regulates the releasing switch 8 being fixed to lock or unlock the belt FIGS. 19 to 24 show the sequence of fixing the tire (wheel) 2 by the automated apparatus 39 on the pallet 3.

FIG. 19 shows that the pallet 3 carries the automobile (passenger car) 1.

The pallet 3 is riding on the pallet supporting board 32. The pallet supporting board 32 is movable by a jack system to adjust the level of the pallet 3. The wheel side support apparatus 12 and the pallet wheel 51 are installed on the pallet 3. The monitor 22 which is placed on the automated wheel fixing apparatus 39 is for detecting the automobile 1 position, and the positions of the tire (wheel) 2, the arm 23 of the robot, and the hand 24 of the robot. The wheel fixing apparatus 39 contains the arm 23 of the robot and the hand 24 of the robot.

FIG. 20 shows that the tongue plate (stopper) 7 is grasped by the hand 24 of the robot and pulled out by the arm 23 of the robot from the retractor 10 which is located on the end of the wheel side support apparatus 12. The whole process is monitored by the monitor 22.

FIG. 21 shows that the tongue plate (stopper) 7 is pulled out by the arm 23 and the hand 24 of the robot from the retractor 10, which is located on the end of the wheel side support apparatus 12. As the tongue plate (stopper) 7 is pulled, the wheel side support apparatus 12 is raised up from the floor of the pallet 3. As the retractor side of the wheel side support apparatus is raised, reinforcement 14 is also raised. The whole process is monitored by the monitor 22.

FIG. 22 shows that the belt 6 is rolled down over the tire (wheel) 2, as the tongue plate (stopper) 7 is grasped by the arm 23 of the robot and pulled out by the hand 24 of the robot from the retractor 10 which is located on the end of the wheel side support apparatus 12. The wheel side support apparatus 12 and the reinforcement 14 are raised completely to prevent the tire's (wheel's) 2 from slipping sideways. The whole process is monitored by the monitor 22.

FIG. 23 shows that the tongue plate (stopper) 7 is attached to the buckle (anchor) 9 which is placed in the floor, by the arm 23 of the robot and hand 24 of the robot to lock with the buckle 9. The whole process is monitored by the monitor 22.

FIG. 24 shows that the wheel 2 is fixed to the floor of the pallet 3 by the wheel fixing apparatus 39.

The tire (wheel) 2 of the automobile 1 is pushed down to the floor by the belt 6, and the belt 6 is locked to the buckle (anchor) 9 through the tongue plate (stopper) 7. Thus, the automobile 1 is fixed on the pallet 3. The whole process is monitored by the monitor 22.

FIG. 25 shows the bird's eye view of the mode-interchange in accordance with the present invention. An automobile is the vehicle in this case, and four of the automated wheel fixing apparatuses 39 are set along the run way of the automobile. First of all, the a automobile 1 is progressing into the guideway 53 from the road 52 as indicated by the arrow sign, and enters the mode-interchange. The automobile 1 runs on the road 52 by itself and onto the pallet 3, however, after being fixed on the pallet 3, the automobile 1 is mobilized by the pallet 3. The pallet 3 runs on the guideway 53. Thus, the automobile 1 moves a automatically Therefore, the mode is converted. Hence, the mode-interchange is the place to convert the mode of the movement. Prior to receiving the automobile 1, the pallet 3 is positioned within an area appropriate for receiving the vehicle by adjustment of the actuator or jack up system. The pallet 3 has four wheels 51 (see FIG. 17). The level of the pallet 3 is adjusted to the same height (level) of the road, so that the automobile is able to mount the pallet 3 smoothly, by using an oil jack-up system which is installed on the pallet support system 32. There is no gap between edge of the road 52 and the edge of the floor 4 of the pallet 3. This adjusting work is performed by the pallet support system 32. Thus, the automobile can continue to roll onto the pallet without doing anything. After the automobile is put on the pallet the arm 23 and the hand 24 of the robot which are installed on the four of the automated wheel fixing apparatuses 39, pull out the belt 6 which is placed in the retractor 10 of the wheel side support apparatus 12. These fix automobile 1 to the pallet 3 automatically as described previously. In this case, the information collecting section 25 such as photo sensor and monitor 22 detects the position of the tire (wheel) 2. Then, the information is sent to the control module 26. Then, the control module 26 regulates the movement of the arm 23 and the hand 24 of the robot of the automated wheel fixing apparatus 39. Furthermore, the compressed air injection arm goes to the inlet for the air, then injects the air to inflate the air bag which is installed in the wheel side support apparatus 12. This figure shows the system before operation. After the entire procedure is completed, the automobile 1 is fixed to the pallet 3, then the automobile 1 is moves on the guideway 53 with the pallet automatically.

INDUSTRIAL ADVANTAGE

This invention, as described in this specification, is comprised of many industrial applications and advantages as follows.

Usually, the material for the belt is a stiff material such as used in the seat belts of automobile. If the same material is used, the usual seat belt has the ability to endure 3 tons per a belt. Therefore, seat belt material is strong enough for fixing a automobile to the floor of the pallet. When all of the wheels are fixed, a pallet can hold 12 tons. Thus, even if the pallet moves and turns quickly, it holds and fixes the car firmly enough. By using this invention apparatus, slipping, deviation from the set area, or destruction of the belt will not happen. Accordingly, when the pallet carrying the automobile runs at high speeds with a large acceleration, the automobile remains fixed on the floor of the pallet very firmly, safely and securely.

This invention fixes the wheel of an automobile. Use of this invention is ubiquitous without requiring the owner of the vehicle to provide any supplementary equipment for the automobile. All the necessary equipment is provided by the pallet system itself. Due to this situation, the owner of any kind of automobile is not required to purchase anything to fix the automobile to the floor. The belt used in the invention is flexible. Its length can be adjusted freely, thus the adjustability of the belt is high. And if the size or position of the wheel is not standard, it can be fit easily. In the range of passenger cars, their tread width and wheel base size is in certain range. This makes it much easier to fix the wheel by using this invention. As the invention is comprised of the belt system which is described above, it is very adaptive for any type of wheel of any automobile.

Because the invention is comprised of a belt which pushes the wheel down, the wheel side support apparatus supports the side of the wheel to prevent the side-ways slipping. Fixing the vehicle onto the pallet becomes very secure. Therefore, the pallet, which carries the vehicle, can secure to itself any type of wheel of any automobile. The wheel fixed by the wheel fixing apparatus is mobilized at high speeds, and thereafter the carried vehicle remains fixed firmly. Separation from the pallet will not happen. Through the reciprocal action force between the vehicle and the pallet there is generated an acting and an anti-acting force, so that the pushed wheel operates to push the vehicle and pallet together. However, when the acceleration force originates from an external force, such as a great acceleration or the braking force, the vehicle and the pallet move together without deviation.

Also, because of this invention, the vehicle is fixed to the pallet by fixing its wheels. Therefore, the suspension system, including springs, still functions perfectly. Therefore, the driver and passengers of vehicle can be kept as comfortable as before they were carried on the pallet. The belt will not loosen because the belt is kept taut by the retractors=3 =0 tension and any flexible materials which are used for the belt. This guarantees the security of the fixing itself.

The slip-preventing material is used so that the belt will not slip from the wheel. The wheel side support apparatus can be used to prevent the lateral slipping of the wheel. The combination of these results in a higher level of security.

The structure of this invention is very simple, therefore, maintenance is less troublesome. Seat belts designed for passengers can be utilized for the belt of the present invention. This results in a much lighter apparatus, which takes up less space. These factors contribute to lower energy costs for mobilizing the vehicle carrying pallet.

When the wheel fixing apparatus is not in use, the wheel fixing apparatus can be put into the pallet floor. This makes it possible for the floor to be totally flat. Since the floor can be made flat, the vehicle has no hindrance for mounting the pallet. It is a smooth operation.

According to the invention, in order to fix the vehicle on the pallet, the apparatus itself can be made very thin. Therefore, the pallet can be made very thin as well. The pallet doesn't require excess thickness. Therefore, when the transportation system is constructed, the pallet shape becomes thin and this will contribute to better energy performance for the operation of the transportation system and contribute to a lower system cost.

The transportation system which employs this invention system (wheel fixing apparatus), the thickness of the pallet can be thin, therefore, the pallet stock warehouse can be very small. This contributes to less-construction costs for the warehouses. Therefore, the total cost of the transportation system can be reduced.

In the transportation system using the pallet carrying system, it is necessary to maneuver the empty pallet (without carrying the automobile) from point to point to accommodate the need for pallets at certain other points. In such a condition, it is better that the pallet is thin, because it is possible that several pallets can be stacked. Therefore, the total cost for running the transportation system can be reduced.

Most vehicles have four wheels per vehicle. The wheel is exposed to the outside of the vehicle. In some cases, the rear-wheel is covered by the vehicle's body. Therefore, using this invention, the method or procedure of fixing is the same. This is completely different from the present technology, using a chain and hook. The chain and hook method requires a manual procedure, it can not be automated. On the other hand, this invention can be automated easily. Thus, the whole procedure can be fully automated. Because the invention has ubiquitousness and promptness, the procedure is performed not only manually, but also can be fully automated. This contributes to the fully automated and immediate procedure for loading and unloading the vehicle on the pallet's floor, and fixing and unfixing its wheel to the floor. Especially for large vehicles, such as trucks, the fixing on the pallet's floor can be done. This makes the new transportation system in which can transport all types of vehicles within the system.

Obviously, any part or all parts of the procedure of the operation of fixing can be done manually. However, the invention apparatus and procedure are employed for the transportation system. While utilizing the same kind of vehicle. Some monitoring systems or positioning sensors can be used for the fixing process with these, the speed of fixing becomes faster.

Also, when the invention system is utilized in a transportation system, the capacity for fixing a large number of vehicle per hour becomes large. This is to absorb heavy traffic. Hence, in the mode-interchange, where vehicles enter and exit the system using this invention's apparatus, the automated fixing procedure for a large and small number of vehicles can be done. This is impossible with current methods and technology.

According to the invention, this is applied to every vehicle transporting field. Carrying vehicles using ships, sea containers or trucks is possible. In these cases, reduction of the operation load, automation and prompt transference occurs. However, this doesn't mean that the invention is limited within the limitation of these uses.

What is claimed is:

1. A wheel fixing apparatus for fixing a wheel with respect to a floor, comprising a belt one end of which has a tongue plate, a retractor which connects to an other end of the belt and which is capable of rolling or unrolling the belt, wherein the retractor is installed on the floor, and a buckle installed on the floor and which is capable of locking or unlocking the tongue plate.

2. The wheel fixing apparatus of claim 1, further including a wheel side supporting apparatus, one end of which is connected to the floor through a hinge, and which is capable of supporting the wheel from a lateral direction, and wherein the wheel side supporting apparatus is adapted to be accommodated within the floor when not in use.

3. The wheel fixing apparatus of claim 1, wherein all or part of the belt is composed of a flexible material or spring.

4. The wheel fixing apparatus of claim 1, wherein all or part of the belt is composed of frictional material.

5. A method of using the apparatus of claim 1, comprising at least the following steps, (a) Pulling the belt from the retractor, wherein the retractor is installed in the floor, (b) Rolling the belt over the wheel by pulling the belt out from the retractor, and (c) Fixing one end of the belt to the other side of the wheel by rolling the belt over the wheel.

6. A method of using the apparatus of claim 1, which further includes a wheel side support apparatus one end of which is connected to the floor through a hinge and which is capable of supporting the wheel from a lateral direction, and which is adapted to be accommodated within the floor when not in use, wherein the retractor is installed in the floor or on the wheel side support apparatus, the method comprising at least the steps of (a) Raising up one end of the wheel side support apparatus from the floor as the other end of the wheel side support apparatus operates as a fulcrum hinge, (b) Rolling the belt over the wheel by pulling the belt out from the retractor, (c) Pulling and rolling the belt over the wheel so that the tongue plate leads the belt, and (d) Fixing the tongue plate to the buckle.

7. A method of using said apparatus of claim 1, which further includes a wheel side support apparatus one end of which is connected to the floor through a hinge, wherein the wheel side support apparatus has an air bag, is capable of supporting the wheel from a lateral direction, and is adapted to be accommodated within the floor when not in use, and further wherein the retractor is installed in the floor or on the wheel side support apparatus, the method comprising at least the steps of (a) Raising up one end of the wheel side support apparatus from the floor as the other end of the wheel side support apparatus operates as a fulcrum hinge, (b) Inflating the air bag is, (c) Rolling the belt over the wheel by pulling said belt out from the retractor (d) Pulling and rolling the belt over the wheel as the tongue plate leads the belt, (e) Fixing the tongue plate to the buckle.

8. A moveable platform having a floor for supporting an automobile including a wheel fixing apparatus for fixing a wheel with respect to the floor, comprising a belt one end of which has a tongue plate, a retractor which connects to an other end of the belt and which is capable of rolling or unrolling the belt, wherein the retractor is installed on the floor, and a buckle installed on the floor and which is capable of locking or unlocking the tongue plate.

* * * * *